(12) United States Patent
Klein et al.

(10) Patent No.: US 10,782,800 B2
(45) Date of Patent: Sep. 22, 2020

(54) DYNAMIC INTERACTION ADAPTATION OF A DIGITAL INKING DEVICE

(71) Applicant: MICROSOFT TECHNOLOGY LICENSING, LLC, Redmond, WA (US)

(72) Inventors: Christian Klein, Duvall, WA (US); Jan-Kristian Markiewicz, Redmond, WA (US); Gregg Robert Wygonik, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/836,735

(22) Filed: Dec. 8, 2017

(65) Prior Publication Data

US 2019/0179431 A1    Jun. 13, 2019

(51) Int. Cl.
*G06F 3/0354* (2013.01)
*G06F 3/0488* (2013.01)

(52) U.S. Cl.
CPC ...... *G06F 3/03545* (2013.01); *G06F 3/04883* (2013.01)

(58) Field of Classification Search
CPC combination set(s) only.
See application file for complete search history.

(56) References Cited

U.S. PATENT DOCUMENTS

| 2013/0286033 | A1 | 10/2013 | Mesaros et al. |
| 2013/0335380 | A1* | 12/2013 | Griffin ............... G06F 3/03545 345/179 |
| 2014/0253468 | A1 | 9/2014 | Havilio et al. |
| 2016/0048021 | A1* | 2/2016 | Border ............... G02B 27/0172 345/690 |
| 2017/0269721 | A1 | 9/2017 | Park |
| 2017/0315631 | A1* | 11/2017 | Pourbigharaz ...... G06F 3/03545 |

FOREIGN PATENT DOCUMENTS

| CN | 106598354 A | 4/2017 |
| WO | 2017033225 A1 | 3/2017 |

OTHER PUBLICATIONS

"International Search Report and Written Opinion Issued in PCT Patent Application No. PCT/US2018/062380", dated Mar. 6, 2019, 22 Pages.

* cited by examiner

*Primary Examiner* — Robin J Mishler
(74) *Attorney, Agent, or Firm* — Newport IP, LLC; Scott Y. Shigeta

(57) ABSTRACT

A digital inking device can automatically adapt its interaction modality to provide contextually relevant status information and contextually relevant user interface control elements based on a user's activity. An interaction model of a digital inking device can automatically adapt the display of particular control user interface control elements and particular status indicators based on one or more factors. For example, a digital inking device can select an interaction model from a number of interaction models based on a way a digital inking device is held by a user, a fingerprint of a user, an angle and/or distance of a digital inking device with respect to a paired computer, a particular grip a user has on a digital inking device, an amount of pressure that is used to hold a digital inking device, a contact pressure between a digital inking device and a paired computer, and/or one more gestures performed by a user.

19 Claims, 14 Drawing Sheets

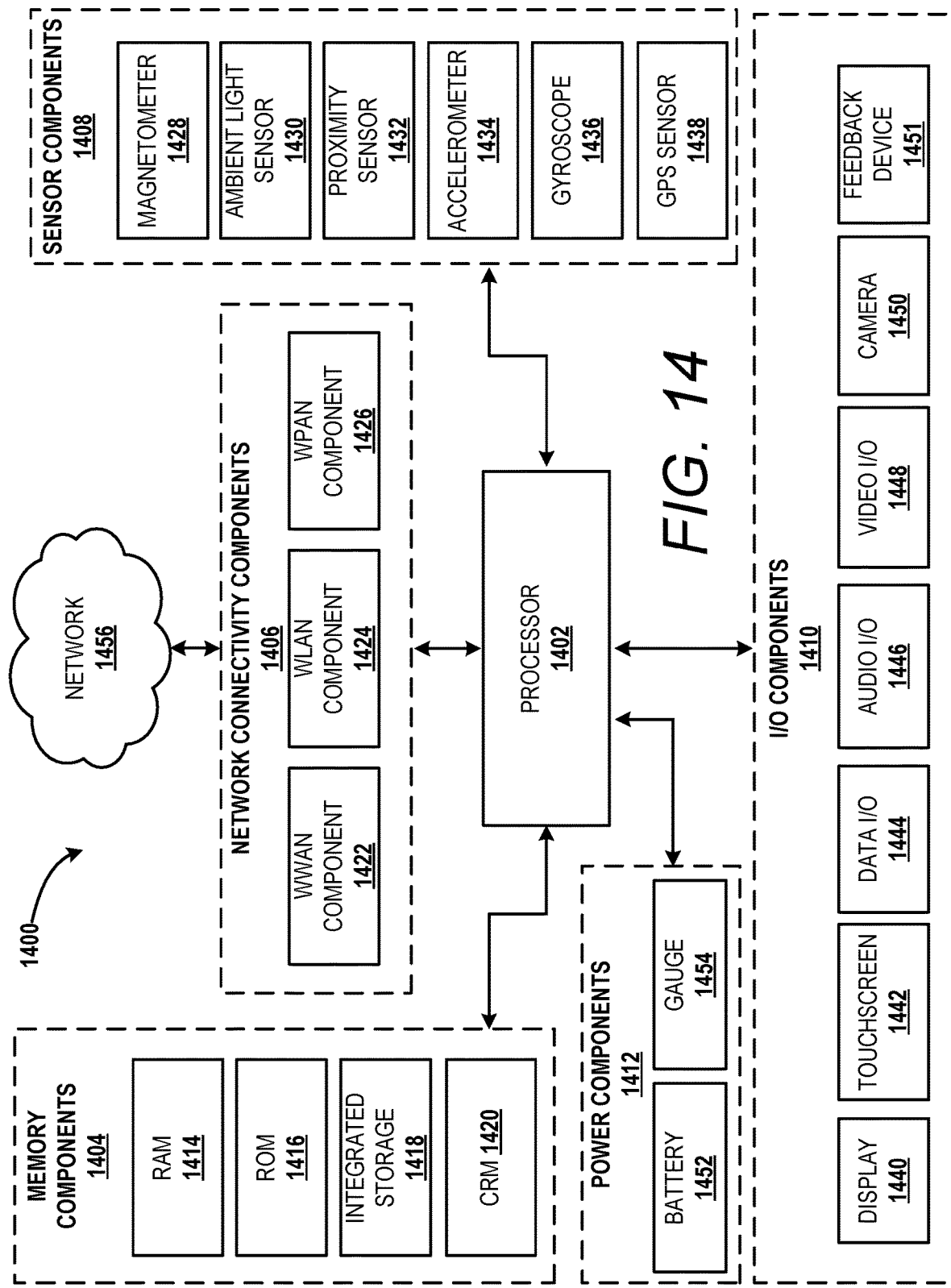

DYNAMIC INTERACTION ADAPTATION OF A DIGITAL INKING DEVICE

BACKGROUND

Digital inking devices, e.g., digital pens, allow users to draw on a display screen to provide input to a paired computer. Some digital inking devices can work in concert with a paired computer to determine an angle of contact and an amount of pressure that is applied to the display screen. Such features can enable a user to convey a wide range of input expressions.

Some existing digital inking devices present a number of shortcomings. For instance, it can be difficult for a user to determine a selected input mode for a digital inking device. Often times, a user is required to view a graphical user interface of a paired computer to determine a pen's color, line thickness, or stroke pattern. Such input mode indicators can consume valuable screen space. In addition, such methods can be inconvenient for users as some applications automatically hide the display of certain status indicators. A user may be required to perform a number of gestures to unhide such indicators in an effort to discover the input mode of a digital inking device. In some scenarios, a person may not know what mode a pen is in until the pen actually touches the surface of a paired computer. This can lead to many inefficiencies, including inadvertent input gestures, unnecessary use of computing cycles, etc.

Among other drawbacks, some existing digital inking devices cannot distinguish one user from another. When several users are collaborating on one display screen using one digital inking device or several digital inking devices, a paired computer cannot associate individual input gestures with each user. In addition, when multiple pens are used with one paired computer, the computer cannot distinguish one pen from another.

SUMMARY

The techniques disclosed herein enable dynamic device interaction adaptation of a digital inking device. Generally described, a digital inking device can select an interaction model to automatically provide contextually relevant status information, contextually relevant user interface (UI) control elements (displayed touchscreen buttons), and contextually relevant functions for the UI control elements based on activity associated with a user and/or activity associated a paired computer. The selection of an interaction model can be based on one or more factors. For example, a digital inking device can select an interaction model based on a way a digital inking device is held by a user, a fingerprint of a user, an angle and/or distance of a digital inking device with respect to a paired computer, a particular grip a user has on a digital inking device, an amount of pressure that is used to hold a digital inking device, contact pressure between a digital inking device and a paired computer, a distance relative to another digital inking device, a relationship relative to a paired computer, and/or one or more gestures performed by a user. The user interface can display, adapt, or remove status indicators, display UI control elements, and/or lights to adapt how a user can interact with a digital inking device. In addition, based on a selected interaction model, a digital inking device can change, enable, or disable the functionality of any button or displayed touchscreen buttons of a digital inking device.

In some embodiments, the techniques disclosed herein utilize one or more sensors to analyze a relationship between a digital inking device and a paired computer to select an interaction model for the digital inking device. For example, a digital inking device may display a first set of UI control elements and a first set of status indicators when in contact with a paired computer. The same digital inking device may transition to another interaction model to display a second set of UI control elements and a second set of status indicators when the digital inking device is not in contact with, or near, a paired computer. In one illustrative example, select status indicators and UI controls may be displayed when the digital inking device is not in contact with, or near, a paired computer. The status indicators and UI controls may be disabled or turned off when the digital inking device is in contact with the paired computer.

In some embodiments, the techniques disclosed herein utilize one or more sensors to analyze user activity or attributes of a user, such as a fingerprint, to select an interaction model for the digital inking device. For example, a digital inking device may display a first set of UI control elements and a first set of status indicators when held by a user in a first direction, e.g., in a horizontal direction. The same digital inking device may display a second set of UI control elements and a second set of status indicators when the digital inking device is held in other directions. In one illustrative example, select status indicators may be displayed when the digital inking device is held in a horizontal direction. The status indicators may be removed or turned off when a user is holding the digital inking device in a vertical direction or at a writing angle.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 14 is a computer architecture diagram illustrating an illustrative hardware and software architecture for a computing system capable of implementing aspects of the techniques and technologies presented herein.

DETAILED DESCRIPTION

Figure 1:
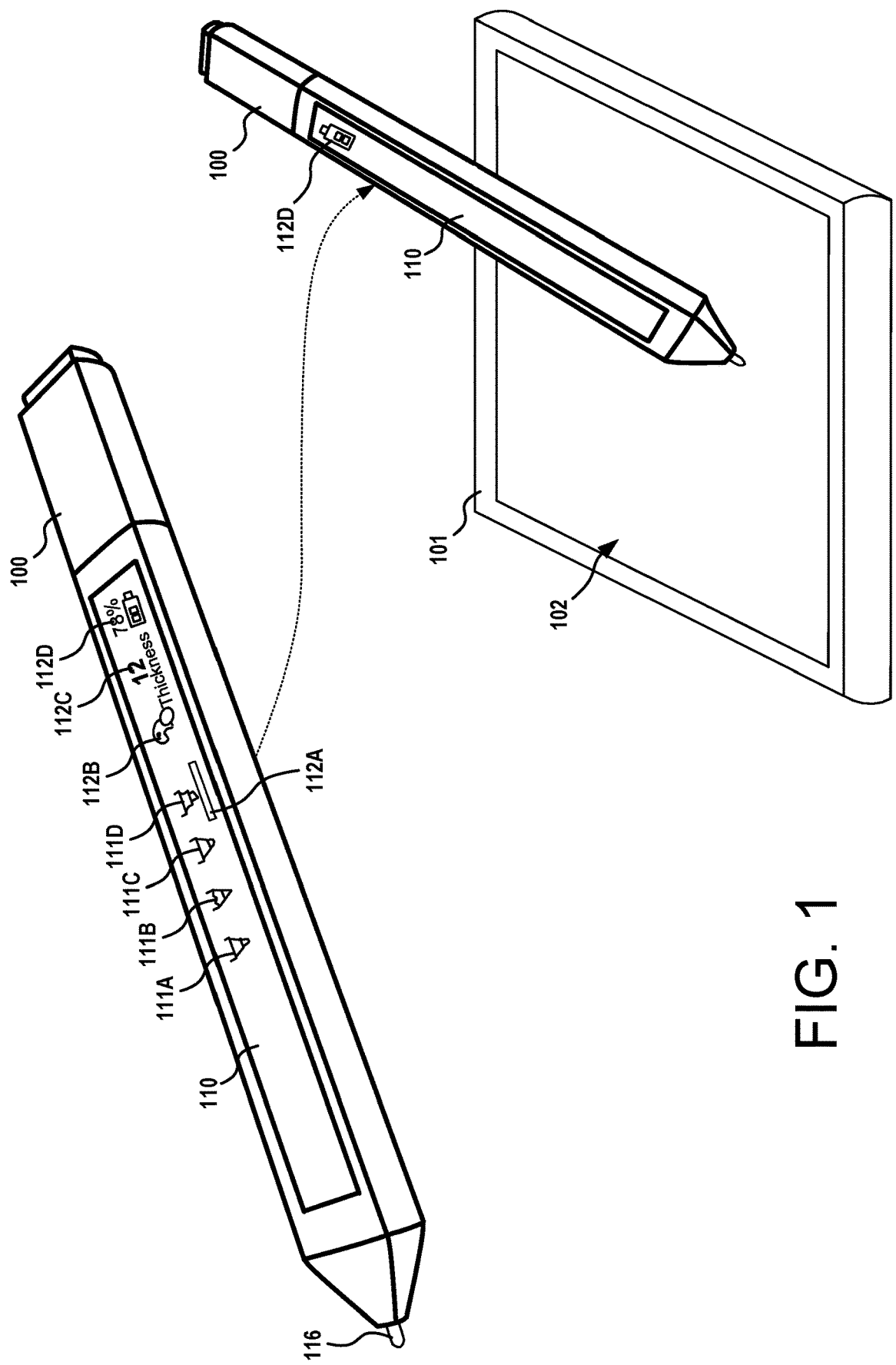
FIG. 1 is a diagram of a digital inking device operating with two different interaction models based on a relationship with a computing device.

This Detailed Description discloses techniques that enable dynamic device interaction adaptation of a digital inking device. Generally described, a digital inking device can select an interaction model to automatically provide contextually relevant status information, contextually relevant user interface (UI) control elements (displayed touchscreen buttons), and contextually relevant functions for the control elements based on activity associated with a user and/or activity associated with a paired computer. The selection of an interaction model can be based on one or more factors. For example, a digital inking device can select an interaction model based on a way a digital inking device is held by a user, a fingerprint of a user, an angle and/or distance of a digital inking device with respect to a paired computer, a particular grip a user has on a digital inking device, an amount of pressure that is used to hold a digital inking device, contact pressure between a digital inking device and a paired computer, and/or one more gestures performed by a user. The user interface can display, adapt, or remove status indicators, displayed UI control elements, and/or lights to adapt how a user can interact with a digital inking device. In addition, based on a selected interaction model, a digital inking device can change, enable, or disable the functionality of any button or displayed touchscreen buttons of a digital inking device.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices, minicomputers, and the like.

It should be appreciated that the above-described subject matter may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interaction with a device may be improved as users can readily identify a digital inking device that is associated with them, and they can readily see an operating mode before they provide an input to a computer. The techniques disclosed herein improve paired devices with small screens in that the paired computer does not need to display status information regarding the digital inking device, resulting in more efficient use of screen space. The techniques disclosed herein also improve paired devices with large screens in that a user is not required to locate and interact with status indicators of a digital inking device that may be spaced apart on a display screen. Among other benefits provided by the techniques disclosed herein, a display screen of a digital inking device can work in concert with the display screen of a paired computer to display select controls and status information to users. This way, the two screens do not waste valuable display areas by duplicating the display of status indicators or UI controls. In addition, the improved features help with other computing resources such as processor and network resources, e.g., users do not have to interact with menus or produce an input to see a thickness or color of a pen, thus reducing interaction, processing cycles and potentially network traffic. Other technical effects other than those mentioned herein can also be realized from implementations of the technologies disclosed herein. Existing digital pens are typically only used to provide an input to a paired computer. The present disclosure offers an improvement over existing devices in that user activity and a user input can change the state and/or an interaction model of the digital inking device itself.

Figure 2:
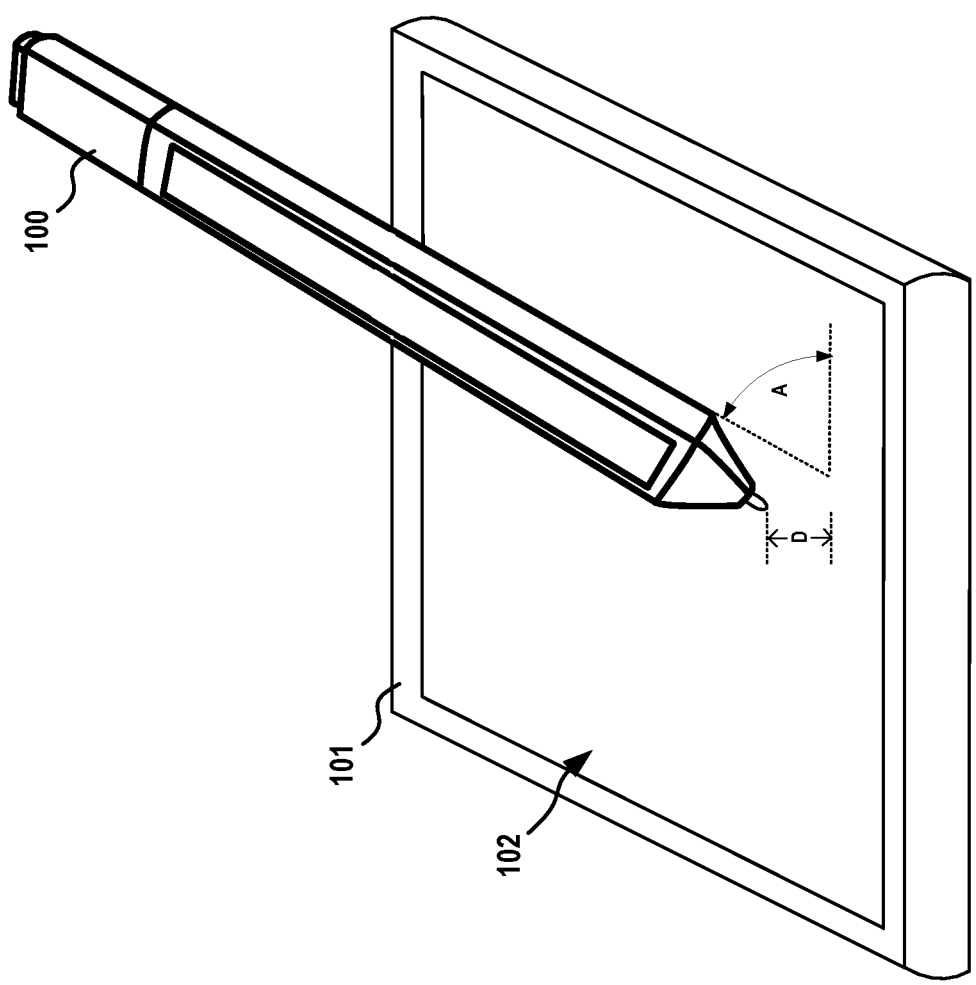
FIG. 2 is a diagram showing aspects of a relationship between a digital inking device and a computing device.

Turning now to FIG. 1 through FIG. 12, several example implementations and several use scenarios are shown and described below. FIG. 1 illustrates an example scenario involving a digital inking device that can operate in multiple interaction modes based on one or more factors. FIG. 2 illustrates aspects of a relationship between a digital inking device and a paired computer. FIGS. 3 through 8 illustrate several example configurations of a digital inking device. FIGS. 9 through 12 illustrate several example scenarios involving a digital inking device that can operate in multiple interaction modes based on user activity and/or a relationship between the digital inking device and a paired computer.

In the example of FIG. 1, a digital inking device 100 is in communication with a computer 101. The digital inking device 100 is also referred to herein as a "digital pen 100" or a "pen 100." The computer 101 is also referred to herein as a "paired device 101" or a "paired computer 101." In some implementations, the computer 101 is in communication with the digital inking device 100 via a wired or wireless communications protocol. Although the examples disclosed herein refer to the paired computer 101 as a device in communication with the digital inking device 100, it can be appreciated that the techniques disclosed herein may also utilize implementations where the two devices are not in communication with one another.

In the example of FIG. 1, the digital inking device 100 comprises a touchscreen 110 for receiving input gestures from a user and for displaying status indicators and UI control elements. This example is provided for illustrative purposes and is not to be construed as limiting. As will be described in more detail below, in other configurations, a digital inking device 100 can comprise a display surface that is separate from an input surface. In other configurations, a display surface can partially overlap an input surface. In addition, other configurations may have buttons and other mechanisms for displaying or communicating status, such as a light that can display one or more colors, an audio device for conveying a status, etc.

In the example of FIG. 1, the touchscreen 110 displays four UI control elements (111A-111D) and a number of status indicators (112A-112D). In this example, the four UI control elements (111A-111D) enable a user to select a pen type, e.g., pencil, marker, etc., and the first status indicator 112A indicates the selected pen type. A second status indicator 112B indicates a color, a third status indicator 112C can indicate a thickness, and a fourth status indicator 112D can indicate the status of a battery. Each status indicator 112 can also function as a control element, thus enabling a user to change one or more of the status indicators by performing a gesture. These UI control elements and the status indicators can be displayed when the digital inking device 100 is operating under a first interaction model. The first interaction model may be selected when a user is holding the digital inking device 100 away from a display surface 102 of a paired device 101.

When the user moves the digital inking device 100 within a predetermined distance from the display surface 102, or when the tip 116 of the digital inking device 100 is in contact with the display surface 102, the digital inking device can transition to a second interaction model. When operating under the second interaction model, the digital inking device 100 can modify the displayed UI control elements 111 and/or modify the display status indicators 112. In the example shown in FIG. 1, when the digital inking device 100 is operating in the second interaction model, e.g., the digital inking device 100 is used to provide an input to the computer 101, the digital inking device 100 removes the display of the UI input controls 111 and only shows a portion of the fourth status indicator 112D. In such an example, an automatic transition from one interaction model to another interaction model can enable the digital inking device 100 to conserve energy. In addition, by the removal of one or more input controls, inadvertent inputs to the digital inking device 100 can be mitigated.

These examples are provided for illustrative purposes and are not to be construed as limiting. It can be appreciated that any digital inking device can show any number of UI control elements 111 and any number of status indicators 112, and the digital inking device 100 can transition to any suitable number of interaction models that provide contextually relevant elements 111 and/or status indicators 112. In addition, the digital inking device 100 can associate any number of functions with the UI control elements based on a user's activity and/or a relationship between the digital inking device 100 and a paired computer 101.

A digital inking device 100 can select an interaction model based on user activity and/or a relationship between the digital inking device 100 and a computer 101. In some examples, an interaction model can be selected based on a way a digital inking device is held by a user, a biometric identifier (e.g., a fingerprint) of a user, an angle and/or distance of a digital inking device with respect to a paired computer, a particular grip a user has on a digital inking device, a contact pressure between a digital inking device and a paired computer, and/or one more gestures performed by a user. The user interface can display, adapt, or remove status indicators, displayed UI control elements (displayed touchscreen buttons), and/or lights to adapt how a user can interact with a digital inking device 100. In addition, based on a selected interaction model, a digital inking device can change, enable, or disable the function of any button, input device, or input surface of a digital inking device.

In some embodiments, a digital inking device 100 can include one or more sensors for determining an input gesture for identifying the user. For example, the sensors can include a touchscreen. The touchscreen can determine a position and/or pressure that is applied when the user grips the digital inking device. Sensors can be used to determine measurements between points where a user's fingers or hand make contact with a digital inking device. These distance measurements and pressure measurements can be used to determine a "grip signature," and an identity of a user and data defining the grip signature can be used, alone or in conjunction with other signals, to select an interaction model. A user may associate one or more preferences with their identity. Thus, in response to determining a user's identity, a digital inking device 100 may select an appropriate interaction model and display preferred status data and settings for that particular user, such as a pen thickness, color, etc. The digital inking device 100 may also display an identifier for the user, which may include a display of a user name, a particular color, etc.

The sensors of a digital inking device 100 can also be used to identify a pattern of movement associated with the user, which can be an air gesture or a hand-writing gesture. In one example, a user can pick up a digital inking device 100, sign his/her name or perform any other type of gesture. When the data defining such gestures matches data of a stored user profile, input gestures can be used to verify a user identity and to select an interaction model.

Such gestures can also be used to provide input to the digital inking device 100. For instance, a user can write a note on any surface, and by the use of one or more sensors, such as an accelerometer and/or gyroscope, the digital inking device 100 can translate the user's movements to text. The text may be displayed on a display surface or a touchscreen for confirmation. The digital inking device 100 can also include a tip that deposits ink on a surface to allow a user to write a message on any surface as the digital inking device 100 translates and stores the gestures in the form of text data or image data. Such input gestures can be combined with other forms of input. For example, as explained in more detail below, a user may provide a voice input to a microphone of the digital inking device 100. The voice input, such as "send a message," can be combined with the translated text and the digital inking device 100 can send a message with the translated text based on both inputs.

In some embodiments, the sensors can be located on a computer in communication with the digital inking device 100. For instance, a camera on the paired computer 101 can generate video data that identifies a particular user and a digital inking device 100. The video data can be analyzed to determine when the particular user is holding the digital inking device 100. The user can be identified by the use of a number of technologies including one or more facial recognition technologies. In embodiments disclosed herein, contextual data can be generated by the sensors or the contextual data can be generated from signals received from the sensors. The contextual data identifying a user can be communicated to the digital inking device 100 for the purposes of selecting an interaction model. The digital inking device 100 can then take one or more actions and/or operate using the selected interaction model. Such embodiments mitigate the need to have sensors on a digital inking device 100. Such embodiments can also supplement sensors on a digital inking device 100.

By identifying a user, a digital inking device 100 can accommodate a number of use scenarios. For illustrative purposes, consider a scenario where there are two users around a single display screen of a paired computer 101. The two users are also utilizing a single digital inking device 100. The first user can utilize the digital inking device 100 to provide input to the paired computer 101. The input can be associated with the first user since the digital inking device 100 can identify the first user. Using techniques disclosed herein, the first user can hand the digital inking device 100 to the second user. The digital inking device 100 can identify the second user based on one or more biometric indicators and associate any performed input to the computer 101 with the second user. Thus, the paired computer can display color-coded annotations, color-coded text, or other types of graphical features to identify each user. Unlike existing systems, the techniques disclosed herein enable a computing device to uniquely identify the input of each user even when they are using the same digital inking device 100. The same can work with multiple pens 100. Such features also can enhance the security of a system. For instance, when a device utilizes a fingerprint technology or another biometric technology, only users that are identified as having appropriate permissions can provide certain types of input or access certain types of data.

In another example, consider a scenario where a number of digital inking devices 100 are mixed together, e.g., stacked on a table or in a pen holder. By displaying a visual indicator that identifies a user, one more users around the pens can immediately identify which device belongs to them. As described herein, a digital inking device 100 may display a user name, a color associated with a user, or provide other visual indicators such as a specific light pulsing pattern associated with a user. Since each digital inking device 100 can dynamically select an interaction model based on one or more signals defining user activity, a visual indicator identifying a user can be disabled when the appropriate user picks up the digital inking device 100 for use.

The sensors of a digital inking device 100 can include a compass, an accelerometer, and/or a solid-state gyroscope. Such sensors can be used to determine a direction in which the digital inking device 100 is held. In such embodiments, one interaction model can be selected when a user holds the digital inking device 100 in a first direction with respect to gravity, e.g., in a horizontal direction, and transition to another interaction model when the user holds the digital inking device 100 at another angle, e.g., at a writing angle. In some embodiments, the sensors of a digital inking device 100 can generate contextual data, i.e., a signal, that indicates an angle of the digital inking device relative to a predetermined reference direction, e.g., gravity or a horizon. Then the digital inking device 100 can select a first interaction model when the angle is within a first predetermined range, or the digital inking device 100 can select a second interaction model when the angle is within a second predetermined range.

As summarized above, a digital inking device 100 can also select an interaction model based on a relationship between the digital inking device 100 and a paired computer 101. As shown in FIG. 2, an interaction model can be selected based on an angle between a digital inking device 100 and the paired computer 101 and/or a distance between the digital inking device and the paired computer 101. For example, in some configurations, a first interaction model may be selected when a distance (D) between the digital inking device 100 relative to the paired computer 101 is greater than a threshold distance. The digital inking device 100 can select a second interaction model when the distance (D) between the digital inking device 100 relative to the paired computer 101 is less than or equal to a threshold distance. For illustrative purposes, the term less than or equal to a threshold distance can mean physical contact between the digital inking device 100 and the paired computer 101.

In some configurations, a first interaction model may be selected when an angle (A) between the digital inking device 100 relative to the paired computer 101 is within a first predetermined range. The digital inking device 100 can select a second interaction model when the angle (A) between the digital inking device 100 and the paired computer 101 is within a second predetermined range (not shown). In some configurations, the angle and the distance may be simultaneously analyzed to select an interaction model.

Figure 3:
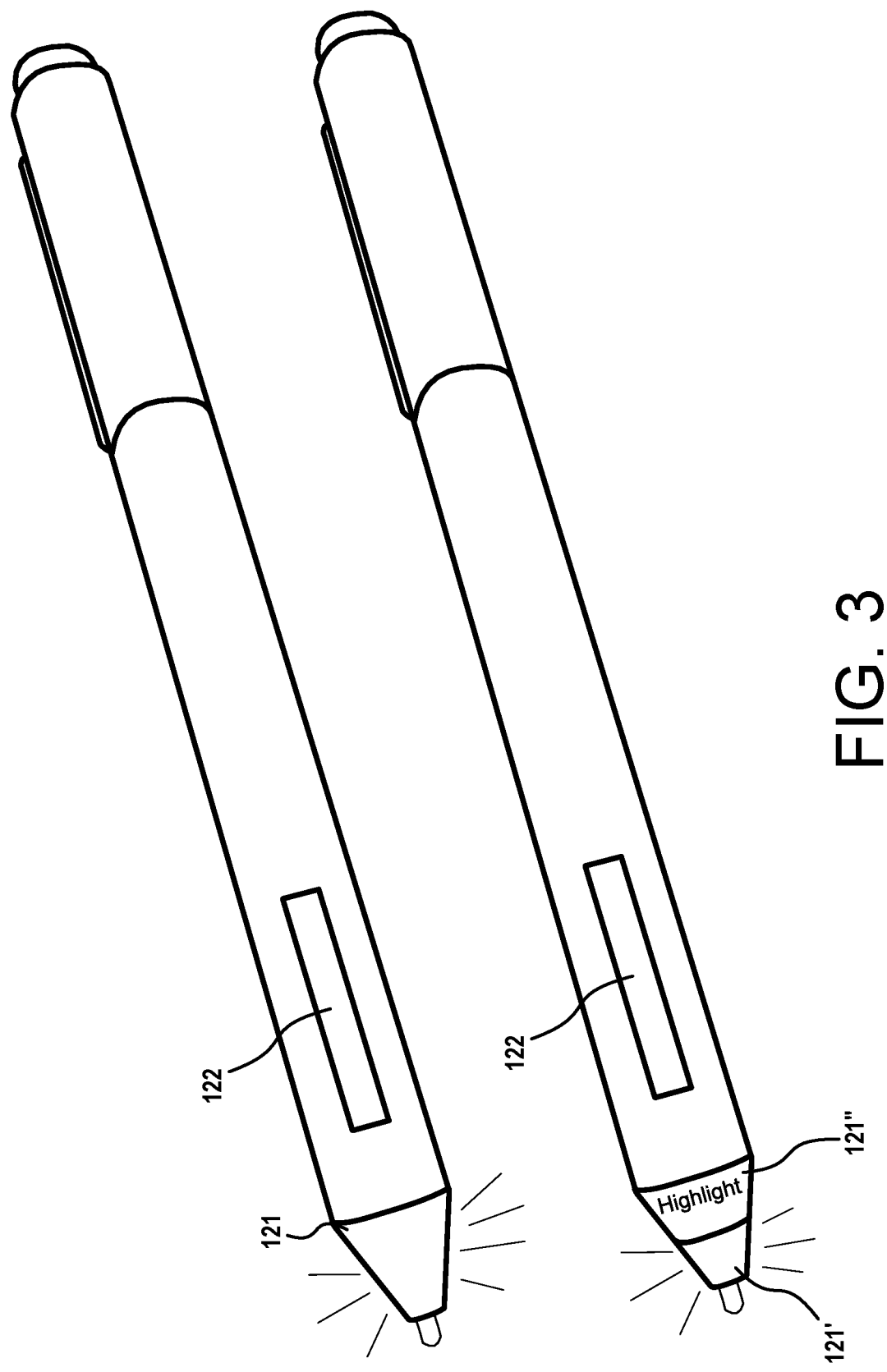
FIG. 3 is a diagram of two example digital inking devices comprising a colored light indicator near the tip and an input surface.

Turning now to FIGS. 3-8, several example configurations of a digital inking device 100 are shown and described below. FIG. 3 illustrates two example embodiments where the display surface 121 comprises a light for displaying selected colors. In the first example on the top of FIG. 3, the display surface 121 can display a color that is associated with the digital inking device 100, or a color or a light pattern associated with a user. In addition, in the second example at the bottom of FIG. 3, a color that is rendered on the display surface 121 can display an indication of width that indicates a thickness of a pen input gesture to the computer 101. Other graphical illustrations can indicate other status indicators.

In embodiments where a color is associated with the digital inking device 100, a user can change a selected color by the use of one or more methods. In one example, a user can touch the tip of the digital inking device 100 to a color palette on the paired computer. When the tip of the digital inking device 100 comes in contact with a section of the display screen on the paired computer 101 displaying a particular color, the digital inking device 100 can select that particular color. In response to the selection, the digital inking device 100 can display that particular color on the display surface 121 of the digital inking device 100.

In such embodiments, the digital inking device 100 can disable or turn off the display of the selected color when the digital inking device 100 is used to provide an input to a paired computer 101. This reduces the amount of glare that is produced on the input surface of the paired computer. However, when the digital inking device 100 is not used to provide an input to the paired computer 101, e.g., when the tip is not in contact with an input surface, the display surface 121 can display a selected color or other status information.

In the second example on the bottom of FIG. 3, the display surface 121 can include two components: a first component 121' for displaying a color and a second component 121" for displaying one or more status indicators. For instance, the first component 121' can indicate a color associated with the device 100 and the second component 121" can indicate an input mode e.g., whether the device 100 is functioning as a highlighter, pen, paintbrush, etc. In addition, the second component 121" can display a user name or other identifier (not shown).

The digital inking device 100 can also include an input surface 122. The input surface 122 can be in the form of a touchpad that can receive gestures of a user, identify a fingerprint, identify a grip of a user, and enable the digital inking device 100 to receive an input to change a state of the digital inking device or to communicate information to the paired computer 101. In such an embodiment, when operating in a first interaction model, the display surface 121 and the input surface 122 may be active. When operating in a second interaction model, e.g., when a user is using the digital inking device to write on the surface of a paired device 101, the display surface 121 and the input surface 122 may be inactive.

Figure 4:
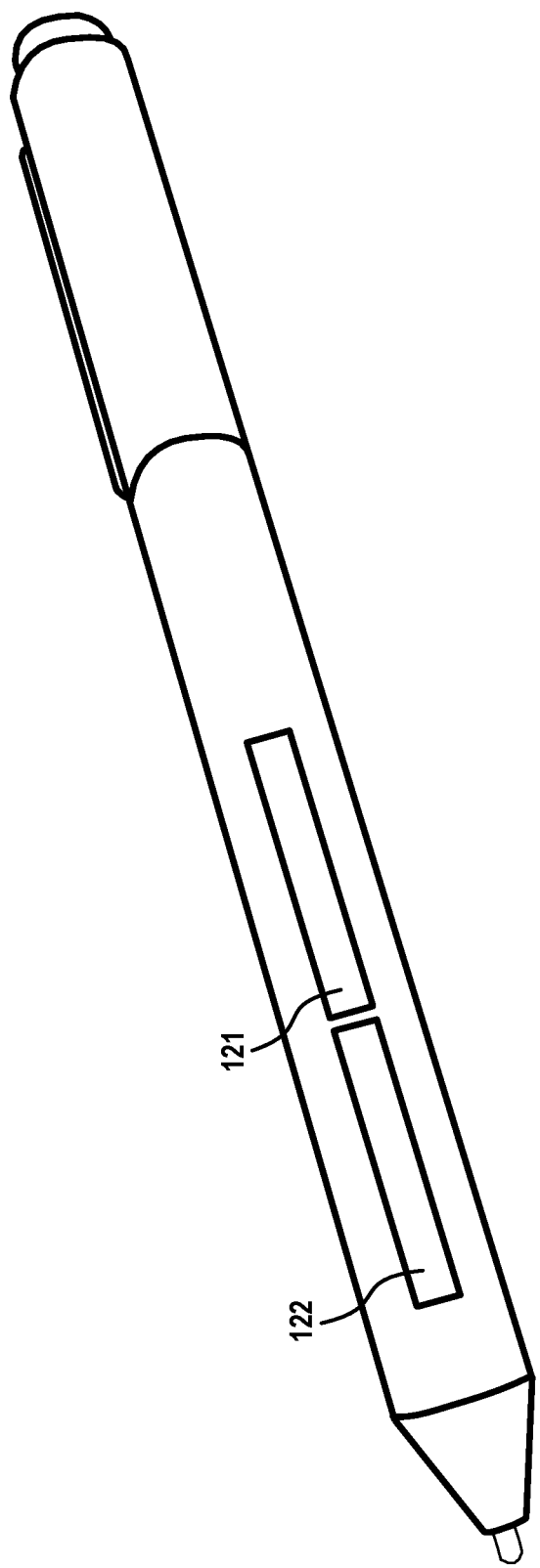
FIG. 4 is a diagram of an example digital inking device comprising a colored light indicator and an input surface positioned on the side of the digital inking device.

FIG. 4 illustrates another example of a digital inking device 100 comprising a display surface 121 and an input surface 122. In this configuration, the display surface 121 and the input surface 122 are positioned on the side of the digital inking device 100. Similar to the embodiments described above, the display surface 121 can display a color that is associated with an input mode of the digital inking device 100 or a color associated with a user. Similarly, the input surface 122 can be in the form of a touchpad for receiving gestures from a user. The display surface 121 can display different status indicators and the input surface 122 can adapt an associated functionality based on a selected interaction model.

Figure 5:
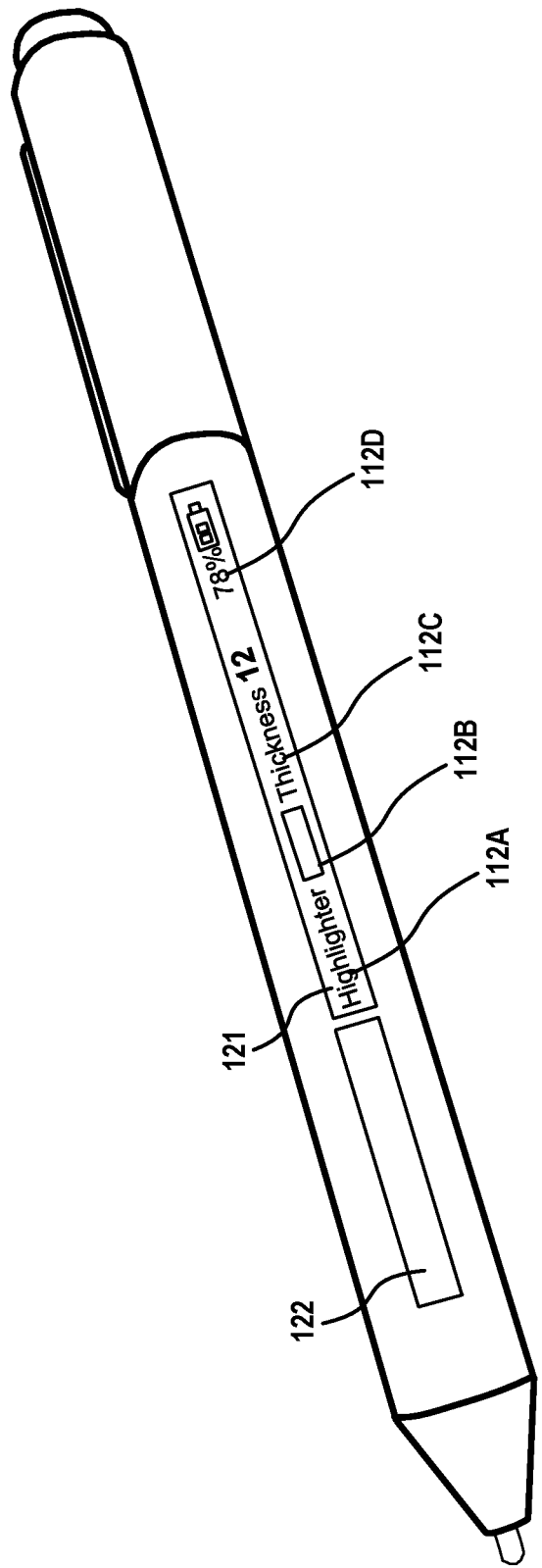
FIG. 5 is a diagram of an example digital inking device comprising a display surface and an input surface positioned on the side of the digital inking device.

FIG. 5 illustrates another example of a digital inking device 100 comprising a display surface 121 and an input surface 122. In this configuration, the display surface 121 is positioned on the side of the digital inking device 100 and the display surface 121 is configured to display one or more status indicators 112. In this example, a first status indicator 112A indicates an input mode of the digital inking device 100, a second status indicator 112B indicates a color associated with the digital inking device 100, a third status indicator 112C indicates a thickness, and a fourth status indicator 112D indicates a status of the battery. The display surface 121 can display different status indicators and the input surface 122 can adapt an associated functionality based on a selected interaction model.

Figure 6:
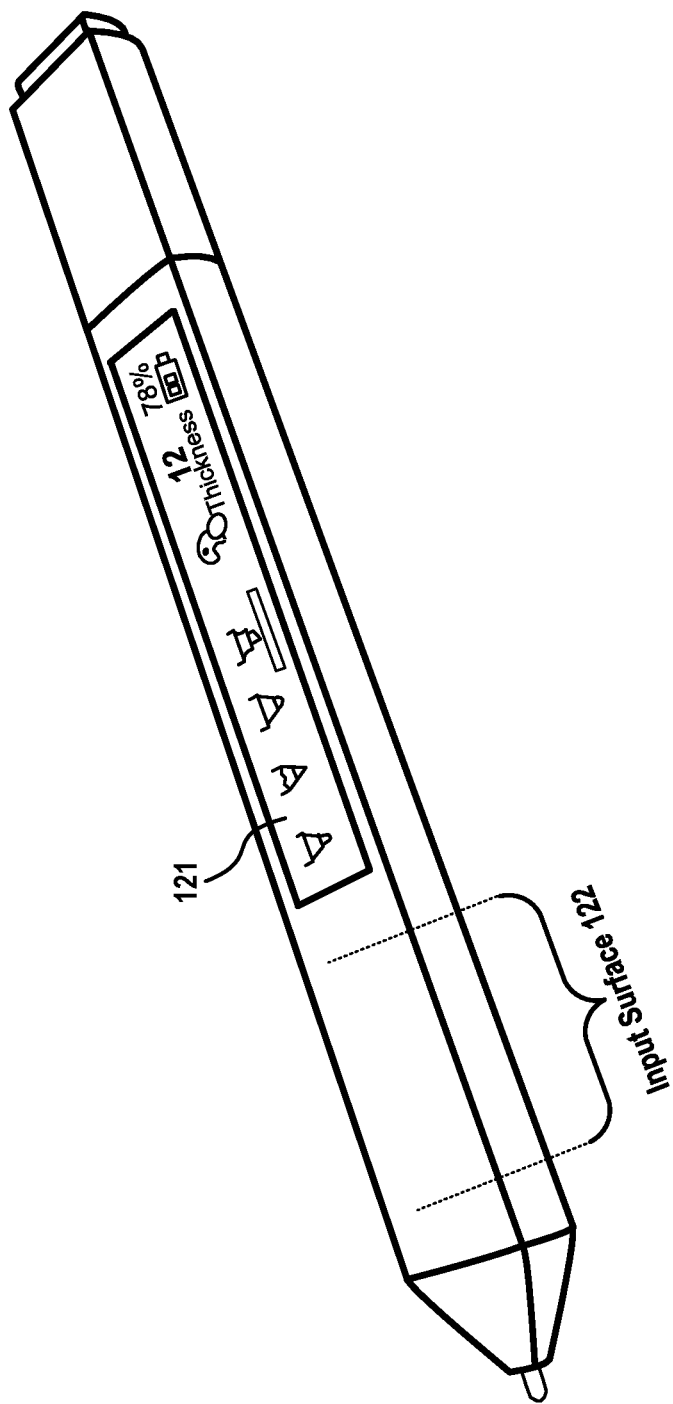
FIG. 6 is a diagram of another example of a digital inking device comprising a large display surface and an input surface positioned on the side of the digital inking device.

FIG. 6 illustrates another example of a digital inking device 100 comprising a display surface 121 and an input surface 122. In this configuration, the input surface 122 is integrated into the side of the digital inking device 100. The input surface 122 can be covered by a fabric to hide the input surface 122. In this example, the display surface 121 is positioned on the side of the digital inking device 100. Similarly, the display surface 121 or a touchscreen 110 can be covered by a fabric to hide the display surface 121 or touchscreen 110 while they are deactivated. User interaction with the input surface 122 can cause one or more state changes of the digital inking device. Such state changes can be displayed on the display surface 121. The display surface 121 and the input surface 122 can display different status indicators or adapt an associated functionality based on a selected interaction model.

In the example of FIG. 6, a user can provide swipe gestures to the input surface 122. In response to such gestures, one or more states of the digital inking device may be adjusted. For instance, as a user provides a swiping gesture to the input surface 122, the digital inking device may change the thickness of the pen. In addition, one or more status indicators can be updated to reflect such a change, e.g., the thickness of 12 may adjust to a higher or lower number.

Figure 7:
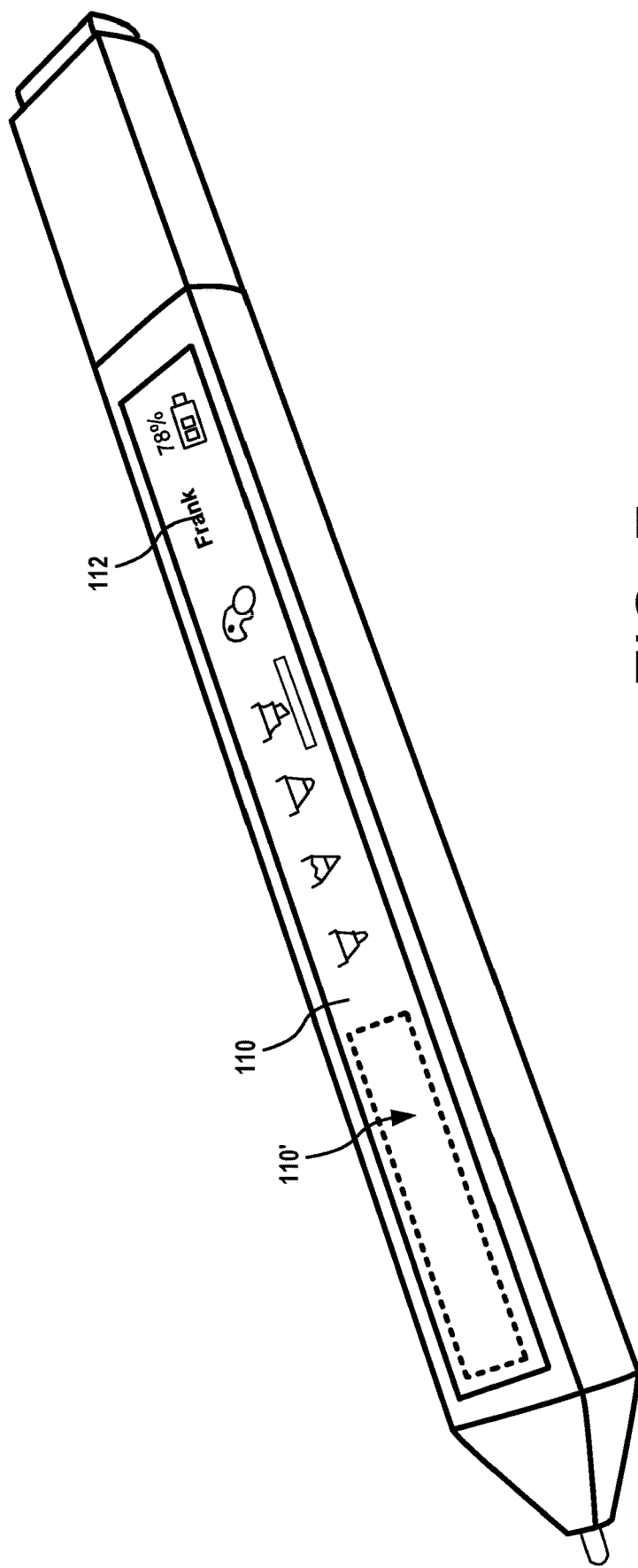
FIG. 7 is a diagram of another example of a digital inking device comprising a touchscreen.

FIG. 7 illustrates another example of a digital inking device 100 with a touchscreen 110. In this example, the digital inking device 100 can include a portion of the touchscreen 110' that is used for receiving user gestures. Based on a selected interaction model defining a set of functions, when a gesture such as a finger swipe is applied to the touchscreen 110' portion, the digital inking device 100 can change a state or perform on or more computer implemented tasks.

The example shown in FIG. 7 also includes a status indicator 112 that identifies a user. As summarized herein, a digital inking device 100 can identify a user by the use of one or more sensors. Once a user is identified, a particular interaction model and/or preferences associated with the user can be selected and utilized to display contextually relevant UI controls and status indicators that are specific to that user. In this example, a user's name ("Frank") is displayed concurrently with other status indicators.

Figure 8:
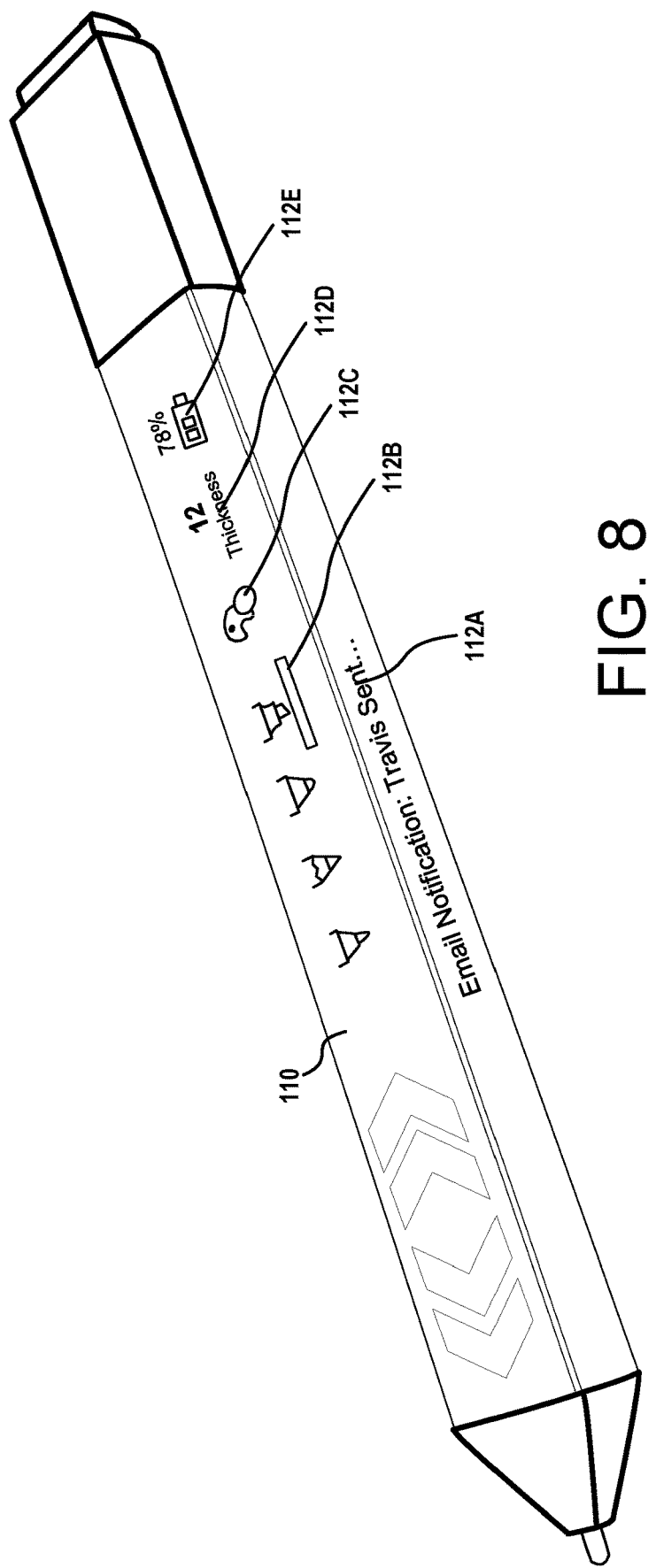
FIG. 8 is a diagram of another example of a digital inking device comprising a touchscreen that is wrapped around the side of the digital inking device.

FIG. 8 illustrates another example of a digital inking device 100 that includes a touchscreen 110 that is wrapped around the sides of the device. As shown, a number of status indicators (112A-112E) may be displayed on all sides of a digital inking device 100. In such an embodiment, when the digital inking device 100 is in one position, e.g., in a horizontal direction, the status indicators (112A-112E) may be displayed. However, when the digital inking device 100 is in contact with the surface of a paired computer 101, the digital inking device 100 can remove, at least in part, one or more status indicators (112A-112E). In one example, some of the status indicators (112B-112E) can be removed when in contact with a paired computer 101, and the digital inking device 100 may only display one indicator, such as the notification 112A.

One or more graphical elements, such as the arrows depicted in FIG. 8, may also be displayed on the touchscreen 110. Such graphical elements can be used to guide a user to a particular section of the touchscreen 110 that may be activated for receiving an input. In this embodiment, the arrows can indicate a swipe direction for changing the state of the digital inking device 100. These examples are provided for illustrative purposes and are not to be construed as limiting. It can be appreciated that many different types of information and status indicators may be displayed based on a selected interaction model.

Figure 9:
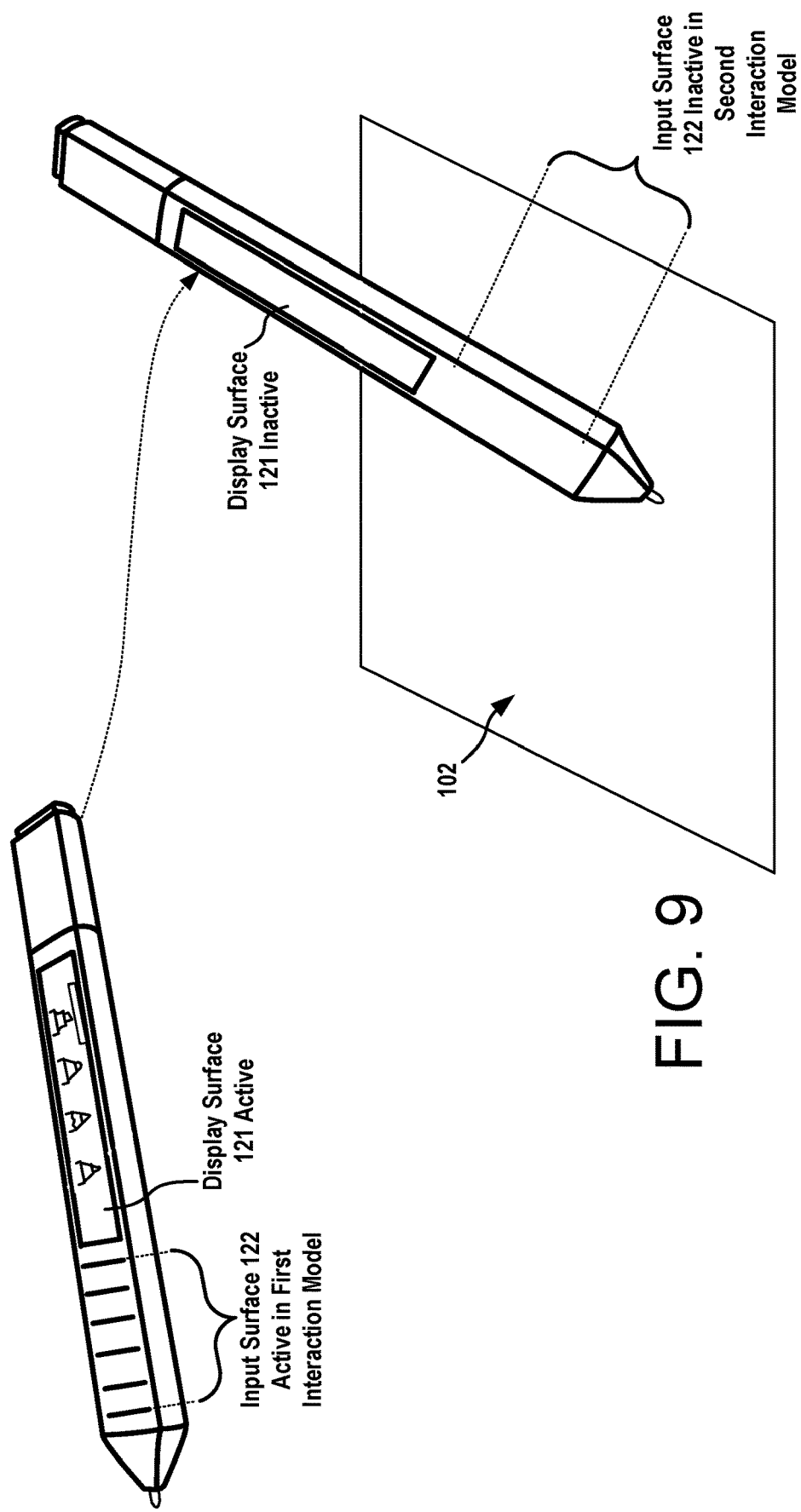
FIG. 9 is a diagram showing a use scenario of a digital inking device having a display screen and an input surface operating with two different interaction models.

FIG. 9 illustrates an example scenario involving a digital inking device 100 comprising a display surface 121 and an input surface 122. In this example, the display surface 121 and the input surface 122 are active while the digital inking device 100 is operating in a first interaction model. In this example, the first interaction model may be selected when the digital inking device 100 is not being utilized as an input device for a paired computer.

The display surface 121 and the input surface 122 can automatically transition to an inactive state while the digital inking device is operating in a second interaction model. In this example, the second interaction model may be selected when the digital inking device 100 is being utilized as an input device to the paired computer 101, e.g., the digital inking device 100 is in physical contact with a display surface 102 of a paired computer.

Figure 10:
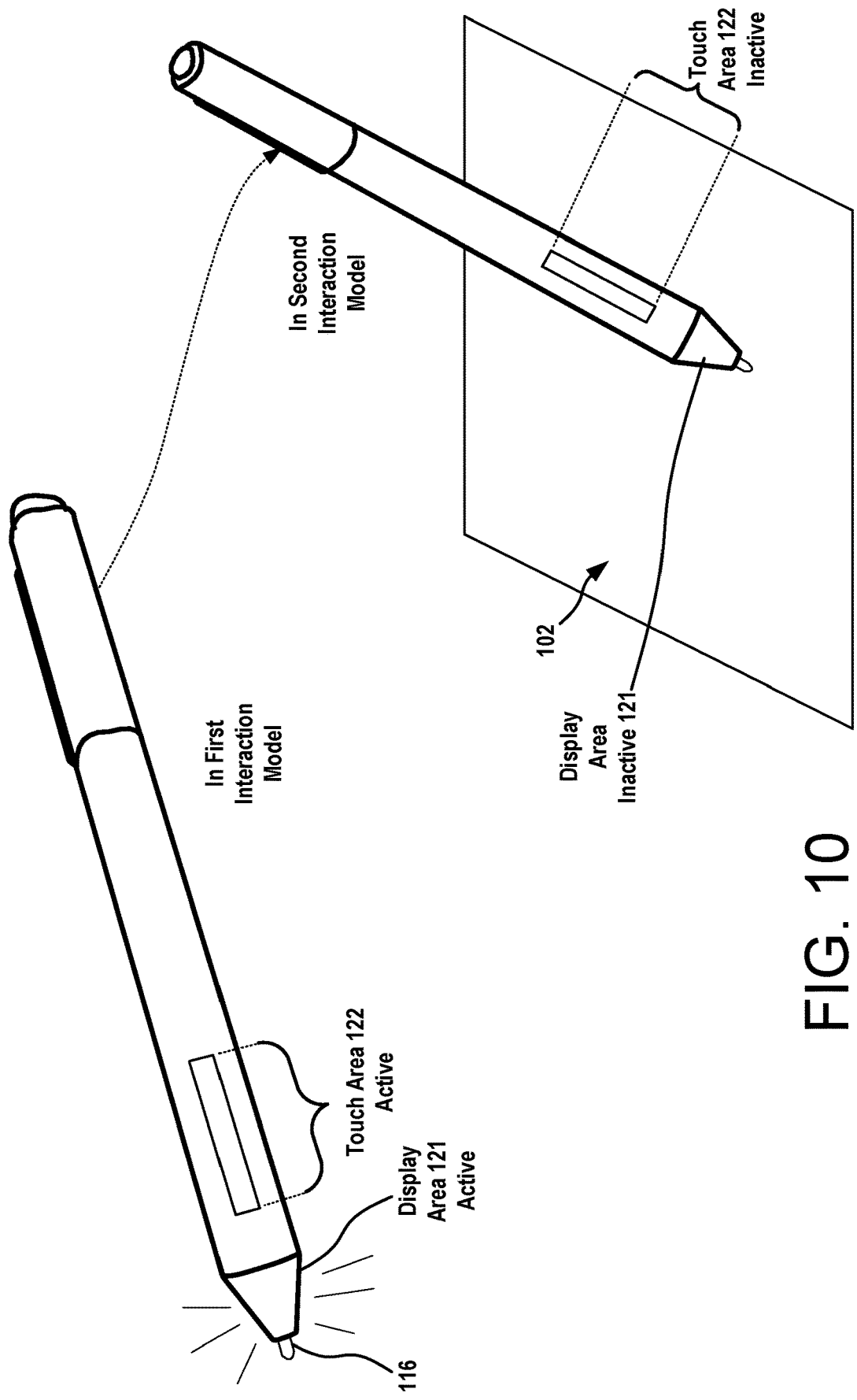
FIG. 10 is a diagram showing a use scenario of a digital inking device having a color indicator and a touch surface operating with two different interaction models.

FIG. 10 illustrates an example scenario involving a digital inking device 100 comprising a display surface 121 positioned near the tip 116 of the device 100. In this example, the display surface 121 may display a selected color associated with the digital inking device 100. Thus, when the digital inking device 100 is not being utilized as an input device for a paired computer, the display surface 121 may indicate a particular color. The display surface 121 and the input surface 122 are inactive, e.g., turned off, while the digital inking device is operating in a second interaction model. In this example, the second interaction model is selected when the digital inking device 100 is being utilized as an input device, e.g., the digital inking device 100 is in physical contact with a display surface 102 of a paired computer.

Figure 11:
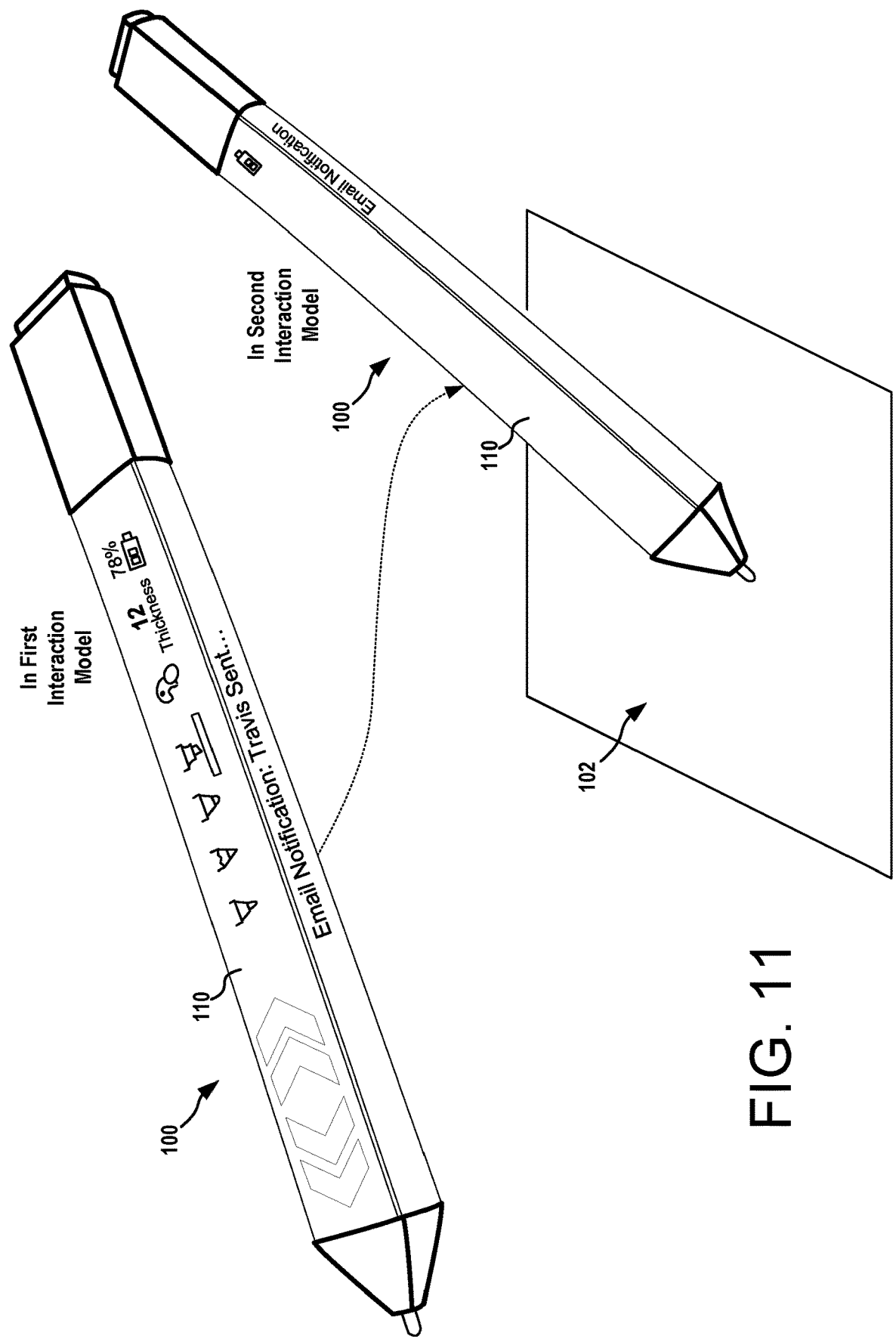
FIG. 11 is a diagram showing a use scenario of a digital inking device having a wrapped touchscreen operating with two different interaction models.

FIG. 11 illustrates an example scenario involving a digital inking device 100 with a wraparound touchscreen 110. In this configuration, while operating in a first interaction model, the wraparound touchscreen 110 can have one or more activated input surfaces, e.g., a touch area indicated by displayed arrows. In addition, while operating in a first interaction model, the wraparound touchscreen 110 can display a number of status indicators.

However, when the digital inking device 100 is operating in a second interaction model, the digital inking device 100 may only display a subset of the status indicators. In this example, while operating in the second interaction model, the digital inking device 100 only displays an email notification and a portion of a battery status indicator. This example is provided for illustrative purposes and is not to be construed as limiting. Any type of notification can be displayed when the pen 100 is operating with either interaction model.

Figure 12:
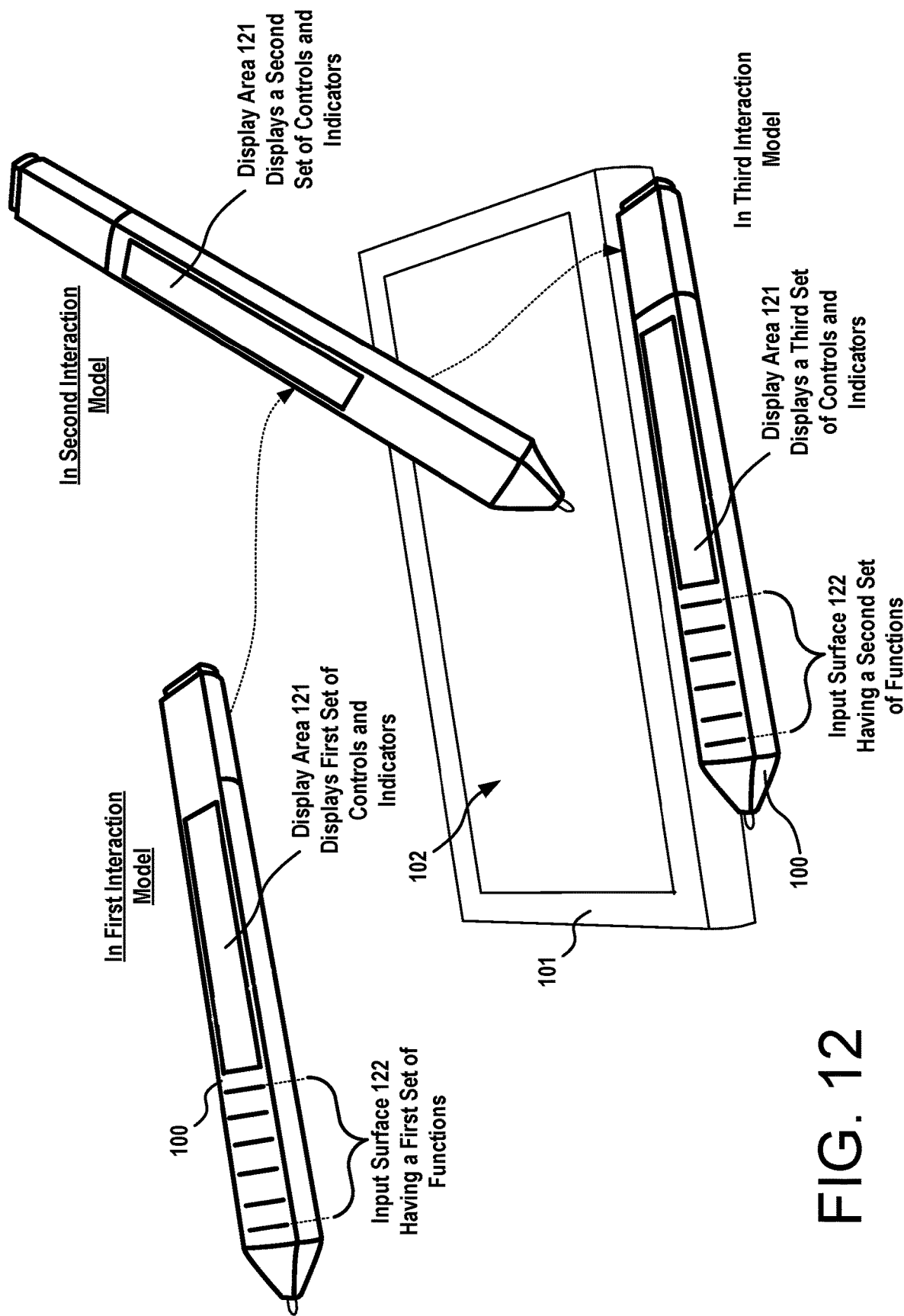
FIG. 12 is a diagram showing a use scenario of a digital inking device having a display screen and a touch surface operating with three different interaction models.

FIG. 12 illustrates another example scenario involving a digital inking device 100 that can attach to a paired computer device. In such a configuration, the digital inking device 100 and the paired computer 101 can include electrically conductive contacts for sensing contact between the devices in a particular manner. One or more fasteners, such as a magnet, can be used to attach the digital inking device 100 to the paired device 101.

As summarized above, a digital inking device 100 can have any number of interaction models. In the example of FIG. 12, the digital inking device 100 can operate with a first interaction model, for instance, when a user is holding the device 100 in a particular way, e.g., in a horizontal direction. When operating in the first interaction model, the display surface 121 can display a first set of status indicators. In addition, in the first interaction model, the input surface 122 can be activated and associated with a first set of functions. For example, the first set of functions may be used to select a thickness associated with the digital inking device 100.

The digital inking device 100 can operate in a second interaction model, for instance, when the user is utilizing the digital inking device 100 to provide input to the paired computer 101. When operating in the second interaction model, the display surface 121 can display a second set of status indicators, which may involve removing one or more status indicators or deactivating the display surface 121. The input surface 122 can also be deactivated.

The digital inking device 100 can operate in a third interaction model, for instance, when the digital inking device 100 is attached to the paired device 101. In this example, when operating in the third interaction model, the display surface 121 can display a third set of status indicators. For example, the display surface 121 may be an extension of the display surface of the paired device 101. In addition, while operating in the third interaction model, the input surface 122 can be activated and associated with a second set of functions. For example, the second set of functions may be used to receive user gestures for providing input to the paired device 101. By the use of such techniques, a display screen of a digital inking device can function as an extension of the display screen 102 of a paired device 101. Such techniques can improve existing digital pens and existing computers by allowing them to work in concert to each display meaningful information without duplicating the display of information or other graphical elements.

Among other use scenarios, a digital inking device 100 can also store information, such as a clipboard of data. Thus, when the user invokes a copy command on a paired computer or a digital inking device 100, the copied data can be stored in a clipboard on a paired computer and communicated to the digital inking device 100. This enables the digital inking device 100 to display the clipboard to the user. When a digital inking device 100 stores multiple clipboard items, a user can provide an input, such as a swipe gesture, to display each clipboard item. A displayed clipboard item can be communicated to a paired computer by the use of one or more gestures, such as tapping the tip of the digital inking device 100 on a display screen of the paired computer while performing a push gesture on an input surface.

In another example, other types of information, such as a color, can be stored on a digital inking device 100. This enables a user to use the digital inking device 100 as a dropper for selecting a color from one computer, and applying that color to another computer. A digital inking device 100 can select a color from a computer when a user performs a particular gesture, such as a swipe gesture that indicates the user is pulling a color from a computer. In addition, the digital inking device can apply color to a particular computer by the use of another gesture, such as a swipe gesture that indicates the user is pushing the color to a paired computer 101.

To further the current example, when the digital inking device 100 is not being used to select a color or apply a color to a computer, the digital inking device 100 can transition to another interaction model where the user can utilize the input surface to scroll through the colors or other data. Thus, the same gesture can have a different meaning, e.g., function, depending on a selected interaction model, e.g., how the digital inking device 100 relates to a paired computer. This example is for illustrative purposes and is not to be construed as limiting. It can be appreciated that other types of data, other than data defining a color, can be selected from a computer and transferred to another computer by the use of the techniques disclosed herein.

In some configurations, a digital inking device 100 can provide a progress indicator for one or more functions. For instance, when a user provides a gesture to share data with another device, e.g., a user performs a push gesture, the digital inking device 100 can display one or more indicators to show the progress of the data transfer or to show that the data transfer is complete. In some examples, a digital inking device may generate an audio signal, haptic feedback, display a graphical indicator, and/or change a state of a light. In one illustrative example, when a push gesture is performed by a user to share data between devices, a graphical indicator, such as the arrows near the tip of the pen shown in FIG. 11, can change colors or change display properties (flash, bold borders, etc.) to illustrate the progress of a function. In some configurations, a haptic signal can be generated to illustrate the progress of a function. These examples are provided for illustrative purposes and are not to be construed as limiting. Any type of progress indicator can be displayed or generated. In addition, the display or communication of a progress indicator can apply to any type of function, such as a scrolling function, data transfer, etc.

In addition, a digital inking device 100 can also communicate any stored information to a cloud service. This way, a user can access any information associated with one digital inking device, such as a collection of interaction models, by the use of other digital inking devices.

In some configurations, a digital inking device 100 can also be used in multimodal input interactions. For example, when a digital inking device 100 is paired with a computer, a user may use the touch surface of the digital inking device 100 in conjunction with a touch surface of the paired computer 100 to coordinate gestures. For example, a particular swipe on a digital inking device in conjunction with a gesture performed on a screen of a paired computer may invoke one or more functions or cause a state change in the digital inking device 100 and/or the paired computer. In another example, input received at the digital inking device can be used as an input for a paired computer 101. Thus, an interaction model of the digital inking device can provide an input for a paired computer 101 and/or an input received at the digital inking device 100 can be combined with an input received at a paired computer 101.

The sensors of a digital inking device 100 can include proximity sensors, such as a radio frequency identification (RFID) circuit. Such sensors can be used to determine a proximity between different digital inking devices, or proximity between a digital inking device and other objects. Thus, embodiments disclosed herein enable users to share information with one another by bringing two or more digital inking devices together. For instance, clipboard data or other data can be shared between two digital inking devices by the use of one or more gestures. For instance, one user can point a first digital inking device at a second digital inking device. The user of the first digital inking device can perform a gesture such as a "pushing swipe" motion, and in response to such an input, the first device may communicate data to the second device. Signals from the proximity sensors can also be used to select an interaction model.

In addition to sharing data, users can share properties between the digital inking devices. For instance, if the first user wants to share a color or brush type with a second user, the first user can communicate though settings by the use of one or more gestures while the devices are in proximity to one another. This feature enables users to share different pen settings without having to swap devices.

The sensors of a digital inking device 100 can also include a microphone. Such sensors can be used to generate one or more signals for selecting an interaction model. For instance, a user can give a voice command to a digital inking device 100 to change a brush type, a pen thickness, or other parameters. This type of input can also be combined with other signals to select one or more interaction models or to change a state or setting of a digital inking device 100. This type of input can also be used to generate information that is shared with a paired computer.

In one illustrative example, a user may perform one or more hand gestures on an input surface to select an interaction model. The user may then provide a combination of inputs to perform a task. For instance, a user may say "send myself a reminder" and the user may perform a handwriting gesture to write a message, e.g., "buy milk." This combination of inputs may then be combined to generate a data defining reminder for the user to buy milk. This data or any other data may be communicated to one or more resources, including an external server, for processing and storage.

Figure 13:
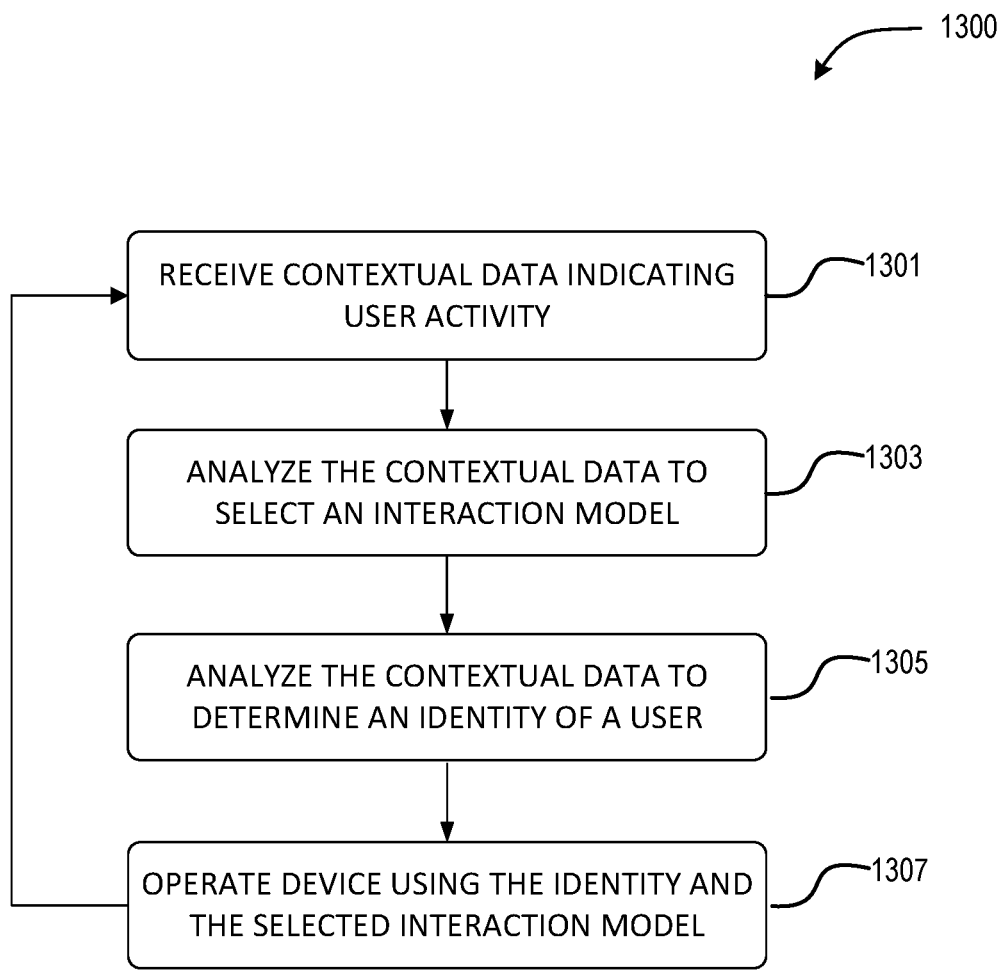
FIG. 13 is a flow diagram showing aspects of a routine for enabling the techniques disclosed herein.

Turning now to FIG. 13, aspects of a routine 1300 for enabling dynamic interaction adaptation of a digital inking device based on user activity are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1300 are described herein as being implemented, at least in part, by one or more modules of a digital inking device, such as components of an operating system or any other module or engine disclosed herein. In some configurations, the one or more modules of the digital inking device can be, for example, a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the FIGURES, it can be appreciated that the operations of the routine 1300 may be also implemented in many other ways. For example, the routine 1300 may be implemented, at least in part, by a processor of another remote computer or a local circuit. In addition, one or more of the operations of the routine 1300 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 13, the routine 1300 begins at operation 1301 where one or more modules of a digital inking device 100 receive contextual data indicating user activity. As described herein, the user activity can be in the form of one or more gestures performed by a user. The user activity can also include a position or orientation in which the digital inking device 100 is held. The user activity can also include how a digital inking device 100 is used relative to a paired computer 101. The contextual data can be in the form of one or more signals received from one or more sensors, such as a camera, gyroscope, accelerometer, or any other sensor suitable for generating contextual data indicating user activity or other activity associated with the digital inking device 100.

Next, at operation 1303, the one or more modules of the digital inking device 100 can analyze the contextual data to select an interaction model from a plurality of interaction models. As described herein, an interaction model can cause the digital inking device 100 to display certain types of information, display one or more user interface input controls, and select a set of functionalities associated with user interface input controls.

Next, at operation 1305, the one or more modules of the digital inking device 100 can analyze the contextual data to determine an identity of a user. As described herein, the identity of a user can be determined by one or more factors. For instance, a sensor may be configured to read a fingerprint of a user. In other examples, a digital inking device can analyze the conditional data to identify a particular user by the performance of one or more gestures. For instance, a user may sign his/her name on a surface, perform an air gesture, hold the pen with a particular grip, hold the pen with a particular amount of pressure, and/or perform any other type of gesture that is associated with a particular identity.

Next, at operation 1307, the one or more modules can cause the digital inking device 100 to operate in accordance with the selected interaction model and/or the user identity. As described herein, input services of the digital inking device 100 can receive different types of gestures based on a selected interaction model. In addition, select information associated with the interaction model can be displayed on a display surface of the digital inking device 100. By selecting an interaction model in response to user activity and/or a relationship between the digital inking device 100 and a paired computer 101, the digital inking device 100 can dynamically adapt its own functionality to accommodate a particular use scenario.

In operation 1307, the one or more modules can cause the digital inking device 100 to provide input to the paired computer 101. For instance, when the tip of the digital inking device 100 is in contact with a surface of a paired computer 101, input data can be generated at the paired computer 101 for generating input data or to change the state of one applications executing on the paired computer 101.

The digital inking device 100 can dynamically switch between interaction models based on any type of user activity and/or a relationship between the digital inking device 100 and a paired computer 101. Thus, the routine 1300 can return to operation 1301 where contextual data defining user activity can be analyzed to repeat the routine 1300.

Turning now to FIG. 14, an illustrative computing device architecture 1400 for a digital inking device and other computing devices that are capable of executing various software components is described herein. The computing device architecture 1400 is applicable to computing devices that facilitate mobile computing due, in part, to form factor, wireless connectivity, and/or battery-powered operation. In some configurations, the computing devices include, but are not limited to, digital pens, digital inking devices, mobile telephones, tablet devices, slate devices, portable video game devices, and the like. The computing device architecture 1400 is applicable to any of the computing devices shown in the accompanying figures. Moreover, aspects of the computing device architecture 1400 may be applicable to traditional desktop computers, portable computers, e.g., phones, laptops, notebooks, ultra-portables, and netbooks, server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse.

The computing device 1400 illustrated in FIG. 14 includes a processor 1402, memory components 1404, network connectivity components 1406, sensor components 1408, input/output components 1410, and power components 1412. In the illustrated configuration, the processor 1402 is in communication with the memory components 1404, the network connectivity components 1406, the sensor components 1408, the input/output ("I/O") components 1410, and the power components 1412. Although no connections are shown between the individual components illustrated in FIG. 14, the components can interact to carry out device functions. In some configurations, the components are arranged so as to communicate via one or more busses (not shown).

The processor 1402 includes a central processing unit ("CPU") configured to process data, execute computer-executable instructions of one or more application programs, and communicate with other components of the computing device architecture 1400 in order to perform various functionality described herein. The processor 1402 may be utilized to execute aspects of the software components presented herein and, particularly, those that utilize, at least in part, a touch-enabled input.

In some configurations, the processor 1402 includes a graphics processing unit ("GPU") (not shown) configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1402 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1402 is, or is included in, a system-on-chip ("SoC") (not shown) along with one or more of the other components described herein below. For example, the SoC may include the processor 1402, a GPU, one or more of the network connectivity components 1406, and one or more of the sensor components 1408. In some configurations, the processor 1402 is fabricated in part utilizing a package-on-package ("PoP") integrated circuit packaging technique. The processor 1402 may be a single core or multi-core processor.

The processor 1402 may be created in accordance with an ARM architecture, available for license from ARM HOLDINGS of Cambridge, United Kingdom. Alternatively, the processor 1402 may be created in accordance with an x86 architecture, such as is available from INTEL CORPORATION of Mountain View, Calif. and others. In some configurations, the processor 1402 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1404 include a random access memory ("RAM") 1414, a read-only memory ("ROM") 1416, an integrated storage memory ("integrated storage") 1418, and a computer readable medium ("CRM") 1420. In some configurations, the RAM 1414 or a portion thereof, the ROM 1416 or a portion thereof, and/or some combination of the RAM 1414 and the ROM 1416 is integrated in the processor 1402. In some configurations, the ROM 1416 is configured to store a firmware, an operating system or a portion thereof (e.g., operating system kernel), and/or a bootloader to load an operating system kernel from the integrated storage 1418 and/or the CRM 1420.

The integrated storage 1418 can include a solid-state memory, a hard disk, or a combination of solid-state memory and a hard disk. The integrated storage 1418 may be soldered or otherwise connected to a logic board upon which the processor 1402 and other components described herein also may be connected. As such, the integrated storage 1418 is integrated in the computing device. The integrated storage 1418 is configured to store an operating system or portions thereof, application programs, data, and other software components described herein.

The computer-readable media (CRM) 1420 can include a solid-state memory, a hard disk, or a combination of solid-state memory and a hard disk. In some configurations, the CRM 1420 is provided in lieu of the integrated storage 1418. In other configurations, the CRM 1420 is provided as additional optional storage. In some configurations, the CRM 1420 is logically combined with the integrated storage 1418 such that the total available storage is made available as a total combined storage capacity. In some configurations, the total combined capacity of the integrated storage 1418 and the CRM 1420 is shown to a user instead of separate storage capacities for the integrated storage 1418 and the removable storage 1420.

As used herein, computer-readable media can store instructions executable by the processing unit(s) 1402. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

It can be understood that one or more of the memory components 1404 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1406 include a wireless wide area network component ("WWAN component") 1422, a wireless local area network component ("WLAN component") 1424, and a wireless personal area network component ("WPAN component") 1426. The network connectivity components 1406 facilitate communications to and from the network 1456 or another network, which may be a WWAN, a WLAN, or a WPAN. Although only the network 1456 is illustrated, the network connectivity components 1406 may facilitate simultaneous communication with multiple networks, including the networks referred to in any description herein. For example, the network connectivity components 1406 may facilitate simultaneous communications with multiple networks via one or more of a WWAN, a WLAN, or a WPAN.

The network 1456 may be or may include a WWAN, such as a mobile telecommunications network utilizing one or more mobile telecommunications technologies to provide voice and/or data services to a computing device utilizing the computing device architecture 1400 via the WWAN component 1422. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1456 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1456 may be configured to provide voice and/or data communications with any combination of the above technologies. The network 1456 may be configured to or adapted to provide voice and/or data communications in accordance with future generation technologies.

In some configurations, the WWAN component 1422 is configured to provide dual-multi-mode connectivity to the network 1456. For example, the WWAN component 1422 may be configured to provide connectivity to the network 1456, wherein the network 1456 provides service via GSM and UMTS technologies, or via some other combination of technologies. Alternatively, multiple WWAN components 1422 may be utilized to perform such functionality, and/or provide additional functionality to support other non-compatible technologies (i.e., incapable of being supported by a single WWAN component). The WWAN component 1422 may facilitate similar connectivity to multiple networks (e.g., a UMTS network and an LTE network).

The network 1456 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that is functioning as a WI-FI hotspot. The WLAN component 1424 is configured to connect to the network 1456 via the WI-FI access points. Such connections may be secured via various encryption technologies including, but not limited to, WI-FI Protected Access ("WPA"), WPA2, Wired Equivalent Privacy ("WEP"), and the like.

The network 1456 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1426 is configured to facilitate communications with other devices, such as peripherals, computers, or other computing devices via the WPAN. For instance, all digital inking devices 100 disclosed herein can be in communication with a paired computer 101 via a BLUETOOTH connection, a WI-FI connection, WI-FI DIRECT connection, etc.

The sensor components 1408 include a magnetometer 1428, an ambient light sensor 1430, a proximity sensor 1432, an accelerometer 1434, a gyroscope 1436, and a Global Positioning System sensor ("GPS sensor") 1438. It is contemplated that other sensors, such as, but not limited to, temperature sensors or shock detection sensors, also may be incorporated in the computing device architecture 1400.

The magnetometer 1428 is configured to measure the strength and direction of a magnetic field. In some configurations the magnetometer 1428 provides measurements to a compass application program stored within one of the memory components 1404 in order to provide a user with accurate directions in a frame of reference including the cardinal directions, north, south, east, and west. Similar measurements may be provided to a navigation application program that includes a compass component. Other uses of measurements obtained by the magnetometer 1428 are contemplated.

The ambient light sensor 1430 is configured to measure ambient light. In some configurations, the ambient light sensor 1430 provides measurements to an application program stored within one the memory components 1404 in order to automatically adjust the brightness of a display (described below) to compensate for low-light and high-light environments. Other uses of measurements obtained by the ambient light sensor 1430 are contemplated.

The proximity sensor 1432 is configured to detect the presence of an object or thing in proximity to the computing device without direct contact. In some configurations, the proximity sensor 1432 detects the presence of a user's body (e.g., the user's face) and provides this information to an application program stored within one of the memory components 1404 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 1432 are contemplated.

The accelerometer 1434 is configured to measure proper acceleration. In some configurations, output from the accelerometer 1434 is used by an application program as an input mechanism to control some functionality of the application program. For example, the application program may be a video game in which a character, a portion thereof, or an object is moved or otherwise manipulated in response to input received via the accelerometer 1434. In some configurations, output from the accelerometer 1434 is provided to an application program for use in switching between landscape and portrait modes, calculating coordinate acceleration, or detecting a fall. Other uses of the accelerometer 1434 are contemplated.

The gyroscope 1436 is configured to measure and maintain orientation. In some configurations, output from the gyroscope 1436 is used by an application program as an input mechanism to control some functionality of the application program. For example, the gyroscope 1436 can be used for accurate recognition of movement within a 3D environment of a video game application or some other application. In some configurations, an application program utilizes output from the gyroscope 1436 and the accelerometer 1434 to enhance control of some functionality of the application program. Other uses of the gyroscope 1436 are contemplated.

The GPS sensor 1438 is configured to receive signals from GPS satellites for use in calculating a location. The location calculated by the GPS sensor 1438 may be used by any application program that requires or benefits from location information. For example, the location calculated by the GPS sensor 1438 may be used with a navigation application program to provide directions from the location to a destination or directions from the destination to the location. Moreover, the GPS sensor 1438 may be used to provide location information to an external location-based service, such as E911 service. The GPS sensor 1438 may obtain location information generated via WI-FI, WIMAX, and/or cellular triangulation techniques utilizing one or more of the network connectivity components 1406 to aid the GPS sensor 1438 in obtaining a location fix. The GPS sensor 1438 may also be used in Assisted GPS ("A-GPS") systems. The GPS sensor 1438 can also operate in conjunction with other components, such as the processor 1402, to generate positioning data for the computing device 1400.

The I/O components 1410 include a display 1440, a touchscreen 1442, a data I/O interface component ("data I/O") 1444, an audio I/O interface component ("audio I/O") 1446, a video I/O interface component ("video I/O") 1448, and a camera 1450. In some configurations, the display 1440 and the touchscreen 1442 are combined. In some configurations two or more of the data I/O component 1444, the audio I/O component 1446, and the video I/O component 1448 are combined. The I/O components 1410 may include discrete processors configured to support the various interfaces described below, or may include processing functionality built-in to the processor 1402.

In some configurations, the computing device 1400 can include feedback device 1451, such as an actuator or solid-state circuit configured to physically vibrate in response to a haptic signal. The processing units can cause the generation of a haptic signal associated with a generated haptic effect to feedback device 1451, which in turn outputs haptic effects such as vibrotactile haptic effects, electrostatic friction haptic effects, or deformation haptic effects. The Feedback device 1451 includes a drive circuit. The feedback device 1451 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, computing device 1400 can include one or more feedback devices 1451. The feedback device 1451 is an example of a haptic output device, where a haptic output device is a device configured to output haptic effects, such as vibrotactile haptic effects, electrostatic friction haptic effects, or deformation haptic effects, in response to a drive signal. In alternate embodiments, the feedback device 1451 can be replaced by some other type of haptic output device. Further, in other alternate embodiments, computing device 1400 may not include an actuator, and a separate device from the computing device 1400 includes an actuator, or other haptic output device, that generates the haptic effects, and computing device 1400 sends generated haptic signals to that device through a communication device.

The display 1440 is an output device configured to present information in a visual form. In particular, the display 1440 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1440 is a liquid crystal display ("LCD") utilizing any active or passive matrix technology and any backlighting technology (if used). In some configurations, the display 1440 is an organic light emitting diode ("OLED") display. Other display types are contemplated.

The touchscreen 1442, also referred to herein as a "touch-enabled screen," is an input device configured to detect the presence and location of a touch. The touchscreen 1442 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1442 is incorporated on top of the display 1440 as a transparent layer to enable a user to use one or more touches to interact with objects or other information presented on the display 1440. In other configurations, the touchscreen 1442 is a touch pad incorporated on a surface of the computing device that does not include the display 1440. For example, the computing device may have a touchscreen incorporated on top of the display 1440 and a touch pad on a surface opposite the display 1440.

In some configurations, the touchscreen 1442 is a single-touch touchscreen. In other configurations, the touchscreen 1442 is a multi-touch touchscreen. In some configurations, the touchscreen 1442 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1442. As such, a developer may create gestures that are specific to a particular application program.

In some configurations, the touchscreen 1442 supports a tap gesture in which a user taps the touchscreen 1442 once on an item presented on the display 1440. The tap gesture may be used for various reasons including, but not limited to, opening or launching whatever the user taps. In some configurations, the touchscreen 1442 supports a double tap gesture in which a user taps the touchscreen 1442 twice on an item presented on the display 1440. The double tap gesture may be used for various reasons including, but not limited to, zooming in or zooming out in stages. In some configurations, the touchscreen 1442 supports a tap and hold gesture in which a user taps the touchscreen 1442 and maintains contact for at least a pre-defined time. The tap and hold gesture may be used for various reasons including, but not limited to, opening a context-specific menu.

In some configurations, the touchscreen 1442 supports a pan gesture in which a user places a finger on the touchscreen 1442 and maintains contact with the touchscreen 1442 while moving the finger on the touchscreen 1442. The pan gesture may be used for various reasons including, but not limited to, moving through screens, images, or menus at a controlled rate. Multiple finger pan gestures are also contemplated. In some configurations, the touchscreen 1442 supports a flick gesture in which a user swipes a finger in the direction the user wants the screen to move. The flick gesture may be used for various reasons including, but not limited to, scrolling horizontally or vertically through menus or pages. In some configurations, the touchscreen 1442 supports a pinch and stretch gesture in which a user makes a pinching motion with two fingers (e.g., thumb and forefinger) on the touchscreen 1442 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1442. As such, the above gestures should be understood as being illustrative and should not be construed as being limiting in any way.

The data I/O interface component 1444 is configured to facilitate input of data to the computing device and output of data from the computing device. In some configurations, the data I/O interface component 1444 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1446 is configured to provide audio input and/or output capabilities to the computing device. In some configurations, the audio I/O interface component 1446 includes a microphone configured to collect audio signals. In some configurations, the audio I/O interface component 1446 includes a headphone jack configured to provide connectivity for headphones or other external speakers. In some configurations, the audio I/O interface component 1446 includes a speaker for the output of audio signals. In some configurations, the audio I/O interface component 1446 includes an optical audio cable out.

The video I/O interface component 1448 is configured to provide video input and/or output capabilities to the computing device. In some configurations, the video I/O interface component 1448 includes a video connector configured to receive video as input from another device (e.g., a video media player such as a DVD or BLURAY player) or send video as output to another device (e.g., a monitor, a television, or some other external display). In some configurations, the video I/O interface component 1448 includes a High-Definition Multimedia Interface ("HDMI"), mini-HDMI, micro-HDMI, DisplayPort, or proprietary connector to input/output video content. In some configurations, the video I/O interface component 1448 or portions thereof is combined with the audio I/O interface component 1446 or portions thereof.

The camera 1450 can be configured to capture still images and/or video. The camera 1450 may utilize a charge coupled device ("CCD") or a complementary metal oxide semiconductor ("CMOS") image sensor to capture images. In some configurations, the camera 1450 includes a flash to aid in taking pictures in low-light environments. Settings for the camera 1450 may be implemented as hardware or software buttons.

Although not illustrated, one or more hardware buttons may also be included in the computing device architecture 1400. The hardware buttons may be used for controlling some operational aspect of the computing device. The hardware buttons may be dedicated buttons or multi-use buttons. The hardware buttons may be mechanical or sensor-based.

The illustrated power components 1412 include one or more batteries 1452, which can be connected to a battery gauge 1454. The batteries 1452 may be rechargeable or disposable. Rechargeable battery types include, but are not limited to, lithium polymer, lithium ion, nickel cadmium, and nickel metal hydride. Each of the batteries 1452 may be made of one or more cells.

The battery gauge 1454 can be configured to measure battery parameters such as current, voltage, and temperature. In some configurations, the battery gauge 1454 is configured to measure the effect of a battery's discharge rate, temperature, age and other factors to predict remaining life within a certain percentage of error. In some configurations, the battery gauge 1454 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1412 may also include a power connector, which may be combined with one or more of the aforementioned I/O components 1410. The power components 1412 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A digital inking device, comprising:
   one or more processors;
   an input surface for receiving input gestures from a user;
   a display surface for displaying attribute data and input control elements;
   a wireless communication device for communicating data with a paired computer
   a tip for providing an input to the paired computer in response to contact with a surface of the paired device; and
   a memory in communication with the one or more processors, the memory having computer-readable instructions stored thereupon which, when executed by the one or more processors, cause the digital inking device to
   receive contextual data from one or more sensors indicating a position of the digital inking device relative to the paired computer;
   analyze the contextual data to select a first interaction model or a second interaction model based on the position of the digital inking device relative to the paired computer;
   in response to determining that the selected interaction model is a first interaction model associated with a first set of functions of the digital inking device, select a first set of input controls for display on the display surface, wherein the first set of input controls is configured to receive input from the user for activating the first set of functions, wherein the first interaction model causes the display of a first set of status indicators on the display surface, wherein a user interface of the digital inking device comprises one or more regions, wherein the one or more regions are associated with the first set of functions when the selected interaction model is the first interaction model; and in response to determining that the selected interaction model is a second interaction model associated with a second set of functions of the digital inking device, select a second set of input controls for display on the display surface, wherein the second set of input controls is configured to receive input from the user for activating the second set of functions, wherein the second interaction model causes the display of a second set of status indicators on the display surface, wherein the one or more regions are associated with the second set of functions when the selected interaction model is the second interaction model, wherein the first set of functions and the second set of functions are different.

2. The digital inking device of claim 1, wherein the input surface and the display surface are overlapping at least partially, wherein the overlapping portions are configured to form a touchscreen.

3. The digital inking device of claim 1, wherein the digital inking device further comprises one or more buttons, wherein the one or more buttons are associated with the first set of functions when the selected interaction model is a first interaction model, and wherein the one or more buttons are associated with the second set of functions when the selected interaction model is the second interaction model.

4. The digital inking device of claim 1, wherein the contextual data indicates a distance (D) between the digital inking device relative to the paired computer, wherein the first interaction model is determined as the selected interaction model when the distance (D) is greater than a threshold distance ($D_{th}$), and wherein the second interaction model is determined as the selected interaction model when the distance is less than or equal to the threshold distance ($D_{th}$).

5. The digital inking device of claim 1, wherein the contextual data indicates an angle (A) of the digital inking device relative to the paired computer, wherein the first interaction model is determined as the selected interaction model when the angle (A) is within a first predetermined range, and wherein the second interaction model is determined as the selected interaction model when the angle (A) is within a second predetermined range.

6. The digital inking device of claim 1,
wherein the first set of status indicators includes a plurality of colors, wherein the first set of functions causes a display of one color of the plurality of colors on the display surface in response to determining that the selected interaction model is the first interaction model, and
wherein the second set of functions causes a removal of the display of the one color in response to determining that the selected interaction model is the second interaction model.

7. The digital inking device of claim 1, wherein the input to the paired computer comprises one of
a color, a stroke thickness, or a brush pattern,
wherein the first set of functions causes a display of at least one of the color, the stroke thickness, and the brush pattern in response to determining that the selected interaction model is the first interaction model, and
wherein the second set of functions causes a removal of the display of at least one of the color, the stroke thickness, or the brush pattern in response to determining that the selected interaction model is the second interaction model.

8. The digital inking device of claim 1, wherein the contextual data from the one or more sensors defines user activity, wherein the selected interaction model is also based on the user activity.

9. A computer-implemented method, comprising:
receiving contextual data from one or more sensors indicating a position of a digital inking device relative to a paired computer;
analyzing the contextual data to select a first interaction model or a second interaction model based on the position of the digital inking device relative to the paired computer;
in response to determining that the selected interaction model is a first interaction model associated with a first set of functions of the digital inking device, selecting a first set of input controls for display on a display surface, wherein the first set of input controls is configured to receive input from the user for activating the first set of functions, wherein the first interaction model causes the display of a first set of status indicators on the display surface, wherein a user interface of the digital inking device comprises one or more regions, wherein the one or more regions are associated with the first set of functions when the selected interaction model is the first interaction model; and
in response to determining that the selected interaction model is a second interaction model associated with a second set of functions of the digital inking device, selecting a second set of input controls for display on the display surface, wherein the second set of input controls is configured to receive input from the user for activating the second set of functions, wherein the second interaction model causes the display of a second set of status indicators on the display surface, wherein the one or more regions are associated with the second set of functions when the selected interaction model is the second interaction model, wherein the first set of functions and the second set of functions are different.

10. The method of claim 9, wherein the input surface and the display surface are overlapping at least partially, wherein the overlapping portions are configured to form a touchscreen.

11. The method of claim 9, wherein the contextual data indicates a distance (D) between the digital inking device relative to the paired computer, wherein the first interaction model is determined as the selected interaction model when the distance (D) is greater than a threshold distance ($D_{th}$), and wherein the second interaction model is determined as the selected interaction model when the distance is less than or equal to the threshold distance ($D_{th}$).

12. The method of claim 9, wherein the contextual data indicates an angle (A) of the digital inking device relative to the paired computer, wherein the first interaction model is determined as the selected interaction model when the angle (A) is within a first predetermined range, and wherein the second interaction model is determined as the selected interaction model when the angle (A) is within a second predetermined range.

13. The digital inking device of claim 9,
wherein the first set of status indicators includes a plurality of colors, wherein the first set of functions causes a display of one color of the plurality of colors on the display surface in response to determining that the selected interaction model is the first interaction model, and wherein the second set of functions causes a removal of the display of the one color in response to determining that the selected interaction model is the second interaction model.

14. The method of claim 9, wherein the input to the paired computer comprises one of a color, a stroke thickness, or a brush pattern, wherein the first set of functions causes a display of at least one of the color, the stroke thickness, and the brush pattern in response to determining that the selected interaction model is the first interaction model, and wherein the second set of functions causes a removal of the display of at least one of the color, the stroke thickness, or the brush pattern in response to determining that the selected interaction model is the second interaction model.

15. The method of claim 9, wherein the contextual data from the one or more sensors defines user activity, wherein the selected interaction model is also based on the user activity.

16. The method of claim 9, wherein the digital inking device comprises one or more buttons, wherein the one or more buttons are associated with the first set of functions when the selected interaction model is a first interaction model, and wherein the one or more buttons are associated with the second set of functions when the selected interaction model is the second interaction model.

17. The digital inking device of claim 1, wherein the first interaction model is selected when the digital inking device is in a first position relative to the paired computer, and the second interaction model is selected when the digital inking device is in a second position relative to the paired computer.

18. The digital inking device of claim 1, wherein the first interaction model or the second interaction model is selected based on a distance between the digital inking device and the paired computer.

19. The digital inking device of claim 1, wherein the first interaction model or the second interaction model is selected based on an angle between the digital inking device and the paired computer.

* * * * *